(12) United States Patent
Contreras

(10) Patent No.: US 10,984,425 B1
(45) Date of Patent: Apr. 20, 2021

(54) SYSTEMS AND METHODS FOR DELIVERING IN-APPLICATION MESSAGES

(71) Applicant: Braze, Inc., New York, NY (US)

(72) Inventor: Julian Contreras, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 17/130,120

(22) Filed: Dec. 22, 2020

(51) Int. Cl.
| | |
|---|---|
| *G06Q 30/00* | (2012.01) |
| *H04N 21/488* | (2011.01) |
| *G06Q 10/10* | (2012.01) |
| *H04L 29/08* | (2006.01) |
| *H04L 12/58* | (2006.01) |

(52) U.S. Cl.
CPC ......... *G06Q 30/016* (2013.01); *G06Q 10/107* (2013.01); *H04L 51/046* (2013.01); *H04L 67/26* (2013.01); *H04L 67/34* (2013.01); *H04N 21/4882* (2013.01)

(58) Field of Classification Search
CPC .. G06Q 30/016; G06Q 10/107; H04L 51/046; H04L 57/26; H04L 57/34; H04N 21/4882
USPC ........................................................ 709/304
See application file for complete search history.

(56) References Cited

U.S. PATENT DOCUMENTS

| | | | |
|---|---|---|---|
| 2014/0113674 A1* | 4/2014 | Joseph .................. | H04W 4/021 455/519 |
| 2016/0112870 A1* | 4/2016 | Pathuri ................. | H04W 12/04 726/4 |
| 2018/0084558 A1* | 3/2018 | Chen ...................... | H04W 4/21 |
| 2018/0249521 A1* | 8/2018 | Kim ....................... | H04W 8/005 |
| 2020/0260140 A1* | 8/2020 | Gonzalez ........... | H04N 21/4126 |
| 2021/0012373 A1* | 1/2021 | Alla .................... | G06Q 30/0259 |
| 2021/0021495 A1* | 1/2021 | Sawabe ................... | H04L 43/18 |
| 2021/0029221 A1* | 1/2021 | Raleigh ................... | H04L 67/04 |

* cited by examiner

Primary Examiner — Alan S Chou
(74) Attorney, Agent, or Firm — FisherBroyles, LLP

(57) ABSTRACT

Systems and methods for presenting an in-application message to a user of a software application make use of trigger events that occur on remote servers. When a remote server notes a trigger event, the remote server sends information about the trigger event to a customer engagement service. The customer engagement service causes a push notification to be sent to a user's computing device that is running a software application. The receipt of the push notification causes a campaign within the software application to log a trigger event, and that logged trigger event causes the campaign to present the user with an in-application message.

22 Claims, 13 Drawing Sheets

_US 10,984,425 B1_

SYSTEMS AND METHODS FOR DELIVERING IN-APPLICATION MESSAGES

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. The present invention is focused on delivering in-application messages to users.

Companies also often engage a customer engagement service to help manage the delivery messages to their customers. The customer engagement service can help control the flow and timing of messages to provide the customers with an enjoyable and informative experience. For example, some customers that are highly engaged with a company may wish to receive messages from the company on a frequent basis. Conversely, customers that are not highly engaged with the company may find frequent messages from the company undesirable. The customer engagement service can help determine what individual customers desire, and then manage the flow of messaging to customers based on their individual desires.

The customer engagement service can also cause messages to be delivered to customers at opportune times when the messaging may have the most influence over customer behavior. Similarly, the customer engagement service may know when certain types of message will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

Similarly, a company can provide software applications that can be installed and run on video streaming devices such as Apple's Apple TV, Amazon's Fire TV Stick, ROKU's streaming players and other similar devices. Once installed and run on such a streaming video device, a company's software application may allow the company's customers to retrieve and view video content. In some instances, a company's software application running on such a streaming video device can be used to accomplish other functions, such as retrieving and displaying textual information, making purchases and conducting various other functions.

One way that the customer engagement service can control the delivery of in-application messages to users is via "campaigns." The company or the customer engagement service can configure a campaign to deliver specific in-application messages to a user upon the occurrence of one or more specific triggering events. For example, if the user makes a purchase from the company using the company's software application, the purchase could be the triggering event that causes an in-application thank you message to be delivered to the user via the software application.

Typically, a campaign implemented by a company's software application is only aware of triggering events that occur within the software application itself, or within the user's computing device running the software application. If a trigger event is noted by a server that is separate from the user's computing device, the software application will be unaware that the trigger event occurred. As a result, a campaign implemented by the software is unable to use the trigger event noted by the separate server to cause an in-application to be delivered to the user.

Also, in situations where an individual has a particular company's software application installed on both a computing device that the individual uses and a video display device, it would be advantageous to coordinate the display of messaging across both devices to enhance the individual's experience with the company. However, delivering coordinated company messages across both the individual's computing device and video display device first requires that the customer engagement service knows which video display device(s) the individual uses to view video content. It is relatively easy to determine which computing devices an individual uses. However, it can be very difficult to determine which video display devices an individual commonly watches.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone, a video display device or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future. That said, portions of the following description focus on in-app messages that are delivered to a user via a client's software application.

Figure 1:
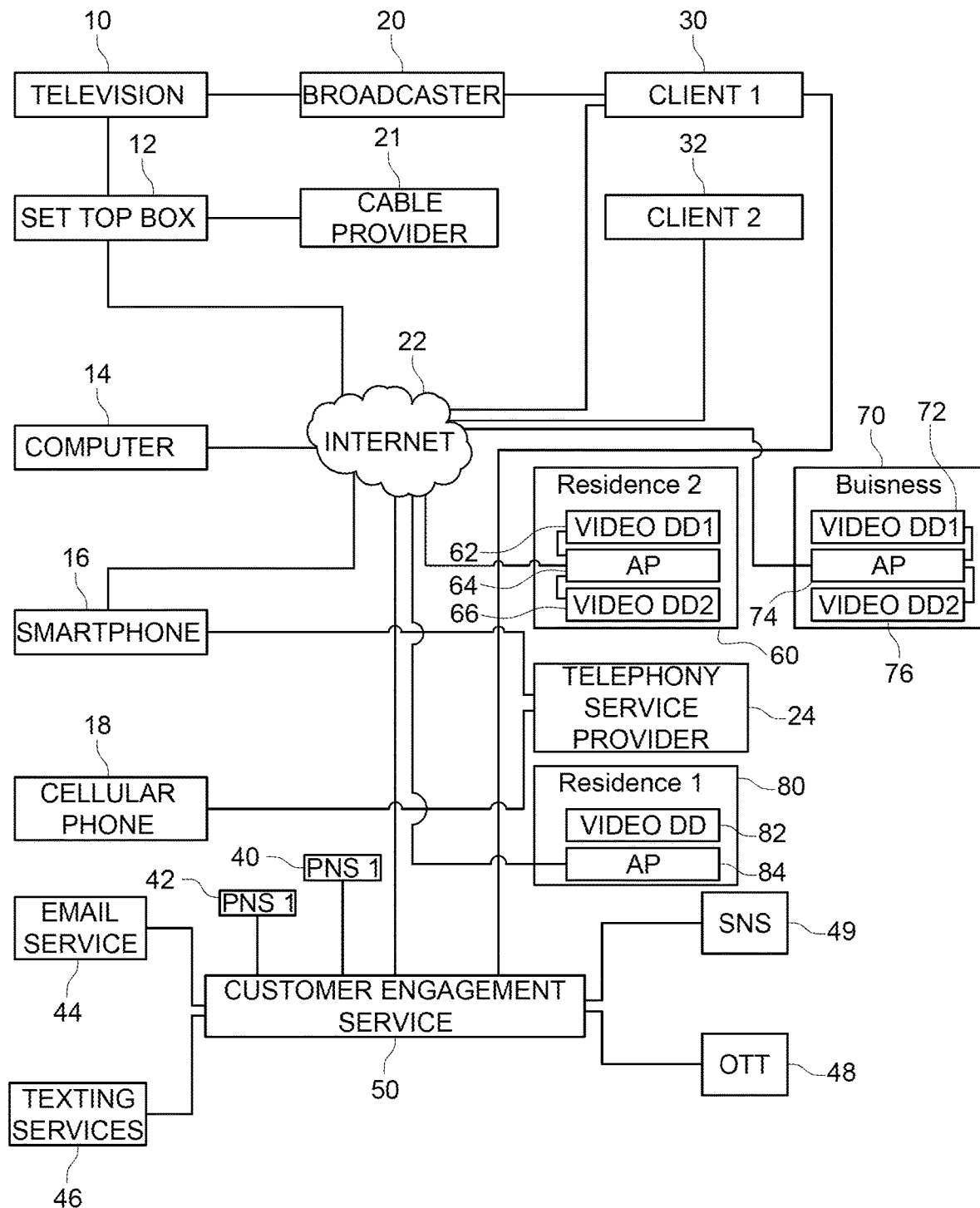
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

FIG. 1 also illustrates that user residences and businesses can include video display devices. A video display device can include a video streaming device coupled or incorporated within a television having a display screen and audio components. Of course, a video streaming device could also be coupled to an independent display screen and independent audio components. Examples of video streaming devices include Apple's Apple TV, Amazon's Fire TV Stick, one of ROKU's streaming players and other similar devices. In some instances, a user's desktop or laptop computer and/or a user's smartphone could act as a video streaming device that streams video content to a display screen and audio components.

For purposes of the following description, we will assume that a video streaming device is to be connected to a display screen and audio components such that the video streaming device can play video for a user and also cause messages to be presented to a user. The components to which a video streaming device is connected may also allow a user to request the display of video content, and also may allow a user to provide input in response to posed questions. For purposes of the following discussion a "video display device" will mean one or more components that include the ability to play video content and display messages. In some embodiments a video display device may also have the ability to receive and interpret user input.

A video display device is coupled to the Internet 22 or some other data network by an access point. Access points can include wireless access points and wired access points. A wired access point can include a set top box used by a traditional cable company to stream video to a user's televisions and computers. The "wire" in this case could be a traditional coaxial cable and/or an optical fiber line. A wireless access point can include wireless routers that are connected to the Internet and that communicate with a video streaming device via a wireless communications protocol such as the IEEE's 802.11 Wi-Fi protocols. In some embodiments, a single access point may provide both a wired Internet connection to a television or video streaming device and wireless Wi-Fi Internet service to portable computing devices such as smartphones, desktop and laptop computers, tablet computing device and other similar devices.

A company's software application can be installed and run on a video display device. In some embodiments, this could mean installing the company's software application on a video streaming device which is itself coupled to a user's television. In other embodiments, a company's software application could be installed and run on a television that allows for the installation of third-party software applications.

Returning now to the depiction provided in FIG. 1, a communications environment may include a first user residence 80 that includes a video display device 82 and an access point 84 that connects the video display device to the Internet 22 or to some other data network.

The communications environment also includes a second user residence 60 that includes a first video display device 62, an access point 64 and a second video display device 66. The access point 64 connects both the first video display device 62 and the second video display device 66 to the Internet 22 or some other data network. For purposes of the following description we will assume that the first video display device 62 is located in a common area of the user residence, and that the first video display device 62 is viewed by all of the individuals that reside at the second user residence 60. The second video display device 66 is located in a bedroom of the residence and is primarily only viewed by a single individual in the second user residence 60.

The communications environment also includes a business 70 that includes a first video display device 72, an access point 74 and a second video display device 76. The access point 74 couples the first video display device 72 and the second video display device 76 to the Internet 22 or some other data network. For purposes of this discussion, we will assume the business 70 is a bar and that the first and second video display devices 72/76 are mounted around the bar and used to display various video feeds such as live and pre-recorded videos of sporting events.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
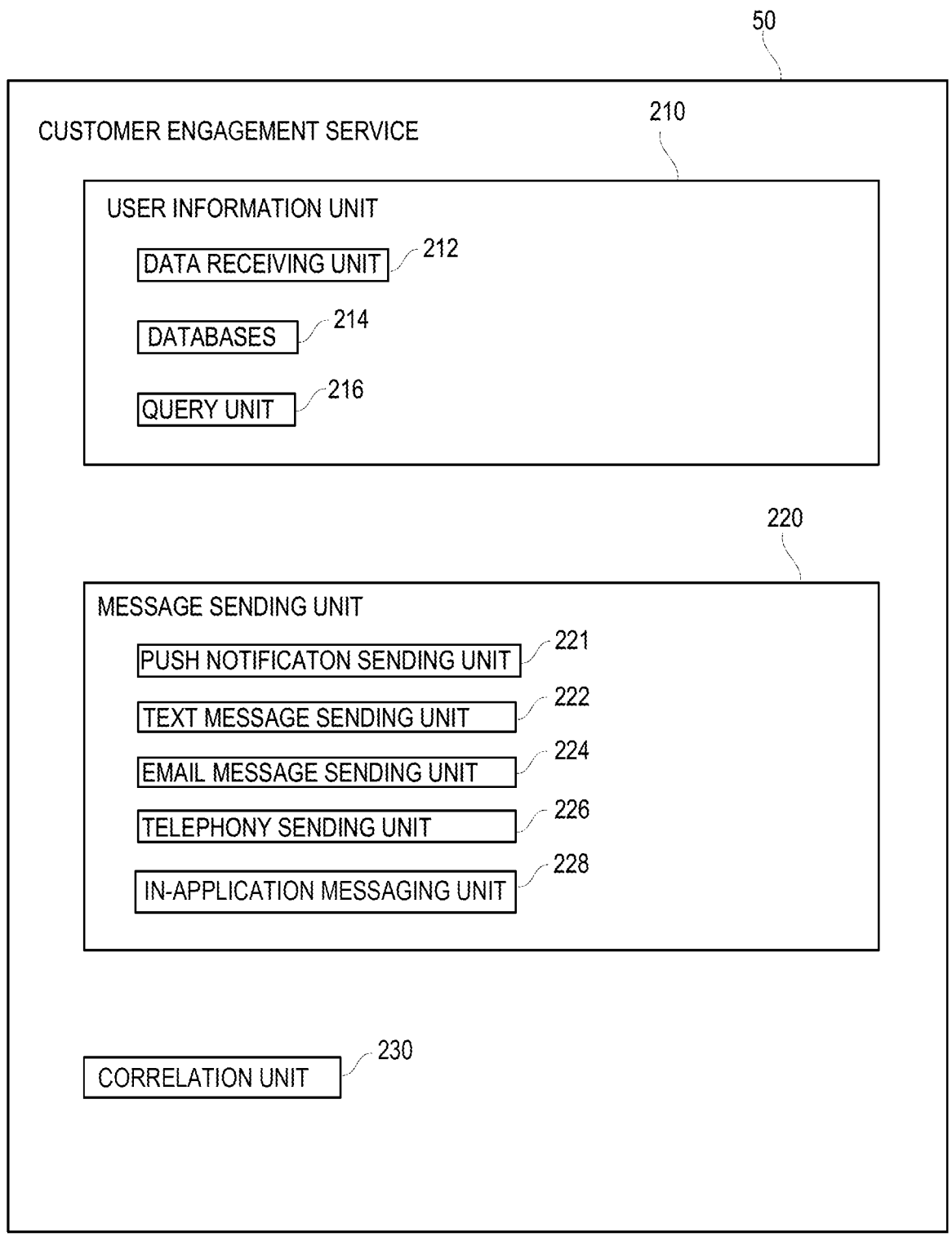
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send data about the purchase made by that user to the data receiving unit 212. As will be explained below, information received by the data receiving unit 212 may satisfy a trigger for causing an in-application message to be presented to a user.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone, a computing device or a video display device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device or a video display device, as will be explained in detail below.

The foregoing and following descriptions refer to "campaigns." A campaign is a designed to deliver one or multiple messages to one or more users upon the occurrence or satisfaction of one or more trigger conditions. A client or the customer engagement service 50 can setup and configure a campaign to present specific messages to one or more users. The message that is presented could be a predetermined message. Alternatively, the message could be generated using a template that is completed with acquired information. The information that is inserted into a message template could be specific to the user to which the message is presented, or it could be more general in nature.

Part of setting up or configuring a campaign is establishing the trigger conditions that must occur in order for the campaign to deliver a message to one or more users. In some instances, only a single trigger condition need be satisfied for a campaign to deliver a message to one or more users. In other instances, multiple trigger conditions must all occur before the campaign will cause a message to be presented to one or more users. As will be explained below, boolean logic can be used to define a set of trigger conditions that must be satisfied before a campaign will cause a message to be sent to one or more users.

A campaign could be implemented by the message sending unit 220 of the customer engagement service. Alternatively, a campaign may be implemented by elements of a software application 300 that is running on a user's computing device or a video display device.

Information relating to a user's activities may be provided to or reported to the in-application messaging unit 228 by a client or a third-party server. For example, a client's server may report that a user has made a purchase from the client, and that information could be delivered to or reported to the in-application messaging unit 228. The fact that the user made a purchase from the client could satisfy a trigger for a messaging campaign that causes an in-application message to be presented to the user. In this example, a user's activity satisfied a trigger for a message campaign. However, in other instances the receipt of other types of information not related to user activity might also satisfy a trigger of a message campaign. Details about how this occurs are provided below.

Figure 3:
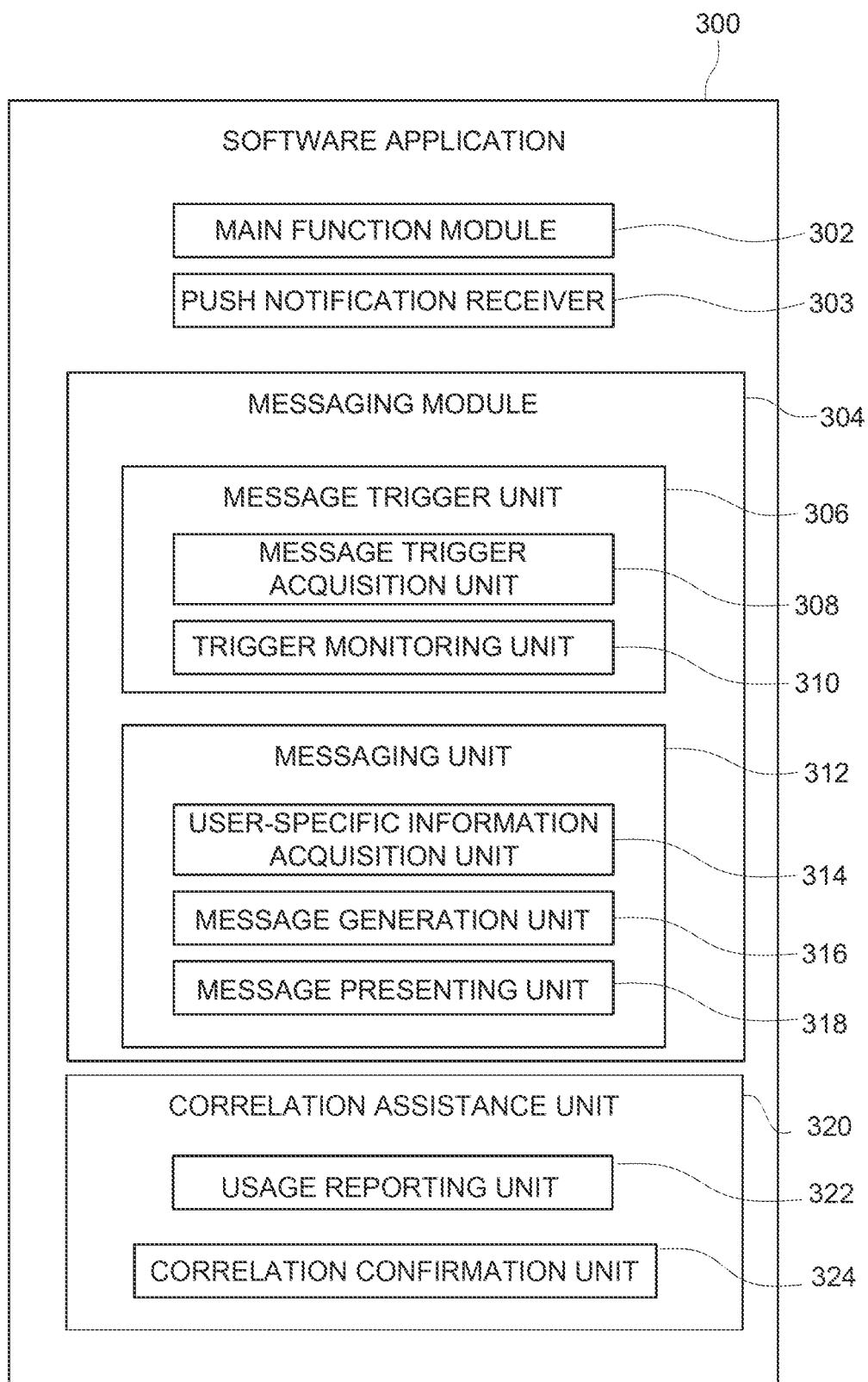
FIG. 3 is a diagram illustrating various elements of a company's software application that is provided to the company's customers.

FIG. 3 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application 300 also includes a push notification receiver 303. The push notification receiver 303 is configured to receive push notifications that have been sent by one or more push notification services 40/42 at the request of a customer engagement service, or some other party. In some embodiments, information extracted from a push notification by elements of a user's computing device are passed to the push notification receiver 303.

As will be explained below, a push notification may be sent to a user's computing device to cause a software application 300 on the computing device to mark a trigger condition for an in-application message as satisfied. Under those circumstances, the push notification receiver 303 may be configured to recognize push notifications that have been specially configured for the purpose of causing a specific trigger condition for a specific in-application message to be marked as satisfied. Also, the push notification receiver 303 may be configured to extract specific types of information from a push notification, and the push notification receiver 303 may then provide that extracted information to a trigger monitoring unit 310 of the software application 300 to cause the trigger monitoring unit 310 to mark a trigger condition as satisfied. The software application also includes a messaging module 304 that is responsible for causing in-application messages to be displayed or played to the user via the software application 300. A display message would be displayed to the user, whereas a video or audio message would be played to the user.

The messaging module 304 includes a messaging unit 312 that is configured to cause an in-application message to be played or displayed to the user when one or more trigger conditions are satisfied. A message trigger acquisition unit 308 of a message trigger unit 306 communicates with the in-application messaging unit 228 of a customer engagement service 50 to obtain information about the trigger conditions under which a message is to be displayed/played to the user. A trigger monitoring unit 310 monitors those conditions to determine when the trigger conditions have been satisfied such that it is time to display/play a particular in-application message to the user.

Also, information extracted from a special push notification that is sent to a user's computing device to cause a trigger condition to be marked as satisfied may be delivered to the trigger monitoring unit 310 to cause the trigger monitoring unit 310 to mark the trigger condition as satisfied. The logging of that trigger condition by the trigger monitoring unit 310 could then cause a campaign within the software application 300 to cause an in-application message to be presented to the user by the messaging unit 312. In some instances, the receipt of the push notification may be all that is required to cause an in-application message to be presented to the user. In other instances, a campaign may be configured with multiple trigger conditions that must be satisfied before an in-application message is presented to the user, and the receipt of the push notification may satisfy only one of those multiple trigger conditions.

In some instances, the in-application message that is presented to a user may be stored in the messaging unit 312. In other instances, the messaging unit 312 obtains all or portions of the in-application message from the in-application messaging unit 228 of the customer engagement service 50. In some instances, a message generation unit 316 may generate the in-application message using a message template and acquired information. In other instances, the messaging unit 312 may obtain the entire message that is to be displayed or played to a user from the in-application messaging unit 228 of the customer engagement service 50, from the client that provided the software application 300, or from a third party. Regardless of whether the in-application message is pre-stored in the messaging unit 312, obtained or generated, a message display unit 318 causes the in-application message to be displayed/played to the user.

In some instances, a user-specific information acquisition unit 314 obtains user-specific information about the user, and the message generation unit 316 then generates a message using the obtained user-specific information.

As mentioned above, the message that is ultimately displayed/played to the user may be generated using a message template. The message template can be created by the client that provided the software application 300, or by the customer engagement service 50. In simple examples, a message template is configured such that customer-specific information, or other forms of information, can be inserted into the message template to generate a personalized or customized message.

A message template can also include sections that will be completed or filled in by evaluating conditional statements or boolean logic-based statements. The conditional statements or boolean logic-based statements can seek information from the customer engagement service, the client that provided the software application or from a third-party source in order to determine whether and/or how to complete a portion of a message template, to thereby generate a message that can be played to displayed to a user.

For example, a portion of the message template may call for an image to be displayed, where the image is intended to represent the prevailing weather at the user's present location. For this to work, conditional statements or boolean-logic-based statements in this portion of the message template are used to determine where the user is presently located, and then the prevailing weather at that location. Then, based on the prevailing weather, a suitable image is obtained and inserted into the message.

The way in which a message trigger is satisfied may also be relevant and used to determine what information to insert into a message template to generate a message that will be displayed or played to the user. For example, if the message trigger is the user playing a video, the type of video that the user played may be used to determine how to generate the message that is ultimately generated and displayed or played to the user. As a result, when the user-specific information acquisition unit 314 requests user-specific information that is needed to generate a message, that request may provide information about how the message trigger was satisfied. The entity that then provides the user-specific information may use the information about how the trigger was satisfied to determine what sort of user-specific information to provide back to the user-specific information acquisition unit 314.

The message trigger itself may include conditional statements or boolean logic-based statements that control what happens when a message trigger is satisfied. For example, if the message trigger is the user playing a video, the message trigger could further specify that if the user played a video relating to sports, the user-specific information acquisition unit 314 should seek user-specific information from entity X, whereas if the user plays a video relating to nature, the user-specific information acquisition unit 314 should seek user-specific information from entity Z.

The conditional statements and boolean logic-based statements within a message template can even determine whether a message is to be displayed or played to the user. For example, a message template may include a conditional statement or boolean logic-based statement that indicates that under certain conditions the message should be displayed to the user, and under certain other conditions the message should not be displayed to the user.

Because the message triggers of a campaign and the message templates can utilize conditional statements and boolean logic-based statements to determine when to deliver a message to a user, and whether and how to generate a message for a user, highly sophisticated personalization for individual users can be achieved. Personalization that goes far beyond simply inserting user-specific characteristics or data (such as a user's name or address) into a message template.

The following description and claims refer to information specific to a user, or user-specific information. Those phrases are intended to encompass simple user characteristic data, such as the user's name and physical characteristics. However, those phrases are also intended to encompass data that is obtained or determined or generated by evaluating conditional statements or boolean logic-based statements within a message template or message trigger. Evaluating the conditional statements and/or boolean logic-based statements may require using simple user characteristics to determine whether and how to generate the message for the user. However, in other instances, no user characteristic data may be needed to evaluate a conditional statement or boolean logic-based statement. Regardless, for purposes of the following discussion, the phrases information specific to a user and/or user-specific information is intended to encompass data that is obtained or determined or generated by evaluating conditional statements or boolean logic-based statements within a message template or message trigger.

In prior art systems and methods, when the software application 300 was first run on the client's computing device, the messaging module 304 of the software application 300 would request information about one or more in-application messages that could potentially be displayed/played to the user. Such a request would be directed to the in-application messaging unit 228 of the customer engagement service 50. The in-application messaging unit 228 of the customer engagement service 50 would then generate one or more messages using user-specific information about the user available in the databases 214 of the user information unit 210. Those messages, and information about corresponding trigger conditions under which the messages are to be displayed/played to the user, would then be sent back to the i messaging module 304 of the software application 300.

The trigger monitoring unit 310 would then monitor the trigger conditions to determine when the trigger conditions for any of the messages are satisfied. If the trigger conditions for one of the messages is satisfied, then the message display unit 318 would cause the message received upon startup of the software application 300 to be displayed/played to the user.

The inventors realized that a significant amount of time could elapse between startup of the software application 300, which is when the messages are created by the in-application messaging unit 228, and the moment when the trigger conditions for the message are satisfied and the message is displayed/played to the user. As a result, one or more items of the user-specific information that was used to create the message could have changed before the message is actually displayed/played to the user. To overcome this drawback, the inventors created a new way of delivering in-application messages to users through a client's software application that result in more up-to-date user-specific information being used to generate the in-application message that is ultimately displayed/played to the user. Details of the new systems and methods are discussed below in conjunction with the flowcharts depicted in FIGS. 4-7.

In some of the new systems and methods, the user-specific information acquisition unit 314 of the messaging unit 312 obtains up-to-date user-specific information only after the trigger conditions associated with a message are satisfied. The up-to-date user-specific information could be obtained from the databases 214 of a customer engagement service 50. Alternatively, the up-to-date user-specific information could be obtained from user information databases maintained by the client that provided the software application 300, or from some other third-party source. The message generation unit 316 then uses the obtained up-to-date user-specific information, and possibly a template for the message, to generate the in-application message that is displayed/played to the user. The message display unit 318 causes the generated in-application message to be displayed/played to the user.

In other embodiments, the messaging unit 312 may request an up-to-date in-application message from the in-application messaging unit 228 of the customer engagement service 50 after the trigger conditions for the message are satisfied. The in-application messaging unit 228 would then generate a message using up-to-date user-specific information obtained from the databases 214 of the customer engagement service 50, or from the client that provided the software application, or from a third-party source. The in-application messaging unit 228 would then generate an in-application message using the up-to-date user-specific information and send that up-to-date in-application message to the messaging unit 312. The message display unit 318 then causes the received in-application message to be displayed/played to the user.

In either of the alternatives outlined above, up-to-date user-specific information is used to generate the in-application message that is ultimately played to the user. As noted above, conditional statements and/or boolean logic-based statements may be present in a message template, and those conditional statements and/or boolean logic-based statements may need to be evaluated to determine whether and how to generate a message that is to be displayed or played to the user. In methods embodying the invention, such conditional statements and/or boolean logic-based statements are only evaluated once a message's trigger conditions have been satisfied, using then current information. These techniques allow systems and methods embodying the invention to overcome the drawbacks of prior art systems and methods for delivering such an in-application message to a user.

The software application 300 also includes a correlation assistance unit 320 that is configured to assist a correlation unit 230 of the customer engagement service 50 in identifying or generating correlations between user computing devices and video display devices. As mentioned above, once a correlation is made between a user's computing device and a video display device that the user commonly uses to view video content, it is possible to coordinate the display of messages to the user across both devices. It is also possible to coordinate the delivery of messages to the user via the user's computing device with the display of certain video content on a correlated video display device.

The correlation assistance unit 320 includes a usage reporting unit 322 to report usages of the software application 300 to the customer engagement service. The usage reports could be sent directly to the correlation unit 230 of the customer engagement service 50. In other instances, usage reports could be sent to the data receiving unit 212 of the customer engagement service 50, and all or a portion of the reported usage information could be relayed from the data receiving unit 212 to the correlation unit 230. In yet other instances, usage information sent to the data receiving unit 212 could be recorded in databases 214, and the correlation unit 230 of the customer engagement service 50 could access usage information in the databases 214 to help generate correlations between user computing devices and video display devices.

Usage reports can include the time at which a user began to interact with the software application and a time at which the user ceased interacting with the software application. The beginning and ending times define a "session." The usage reports can also include information that is used to uniquely identify the device upon which the software application is running.

Such uniquely identifying information could include an indication of the Internet Protocol (IP) address that the user computing device or video display device running the software application 300 is using to communicate over a data network, such as the Internet 22. The IP address is typically the IP address used by a corresponding wired or wireless access point that the device running the software application 300 is using to access a data network, such as the Internet 22. The uniquely identifying information included in usage reports could also include the Service Set Identifier (SSID) of the WiFi network that the user computing device or video display device is using to connect to a data network. Further, the uniquely identifying information in usage reports could be a media access control (MAC) address assigned to the wired or wireless access point that the user computing device or video display device is using to access the data network. The way in which usage reports are used to correlate user computing devices to video display devices is discussed in detail below.

The correlation unit 320 may also include a correlation confirmation unit 324 that aids a correlation unit 230 of a customer engagement service in attempting to confirm that a user computing device should be correlated with a particular video display device. The confirmation process can involve displaying a message to the user of the user computing device or video display device running the software application 300, receiving user input provided in response to the message, and relaying the user input to the correlation unit 230 of the customer engagement service 50. Details regarding the confirmation procedures are provided below.

Figure 4:
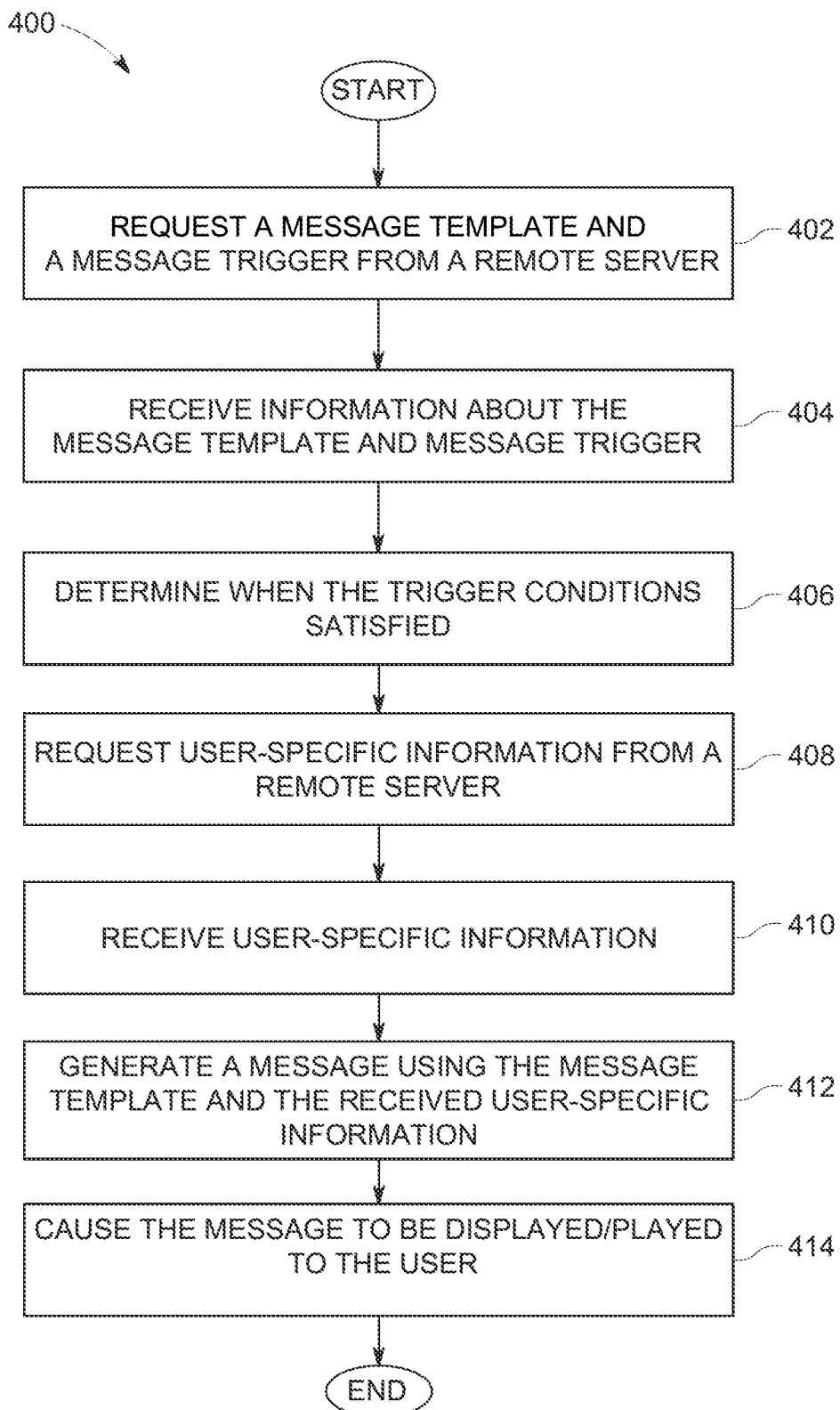
FIG. 4 is a flowchart illustrating steps of a first method embodying the invention that would be performed by elements of a company's software application.
Figure 5:
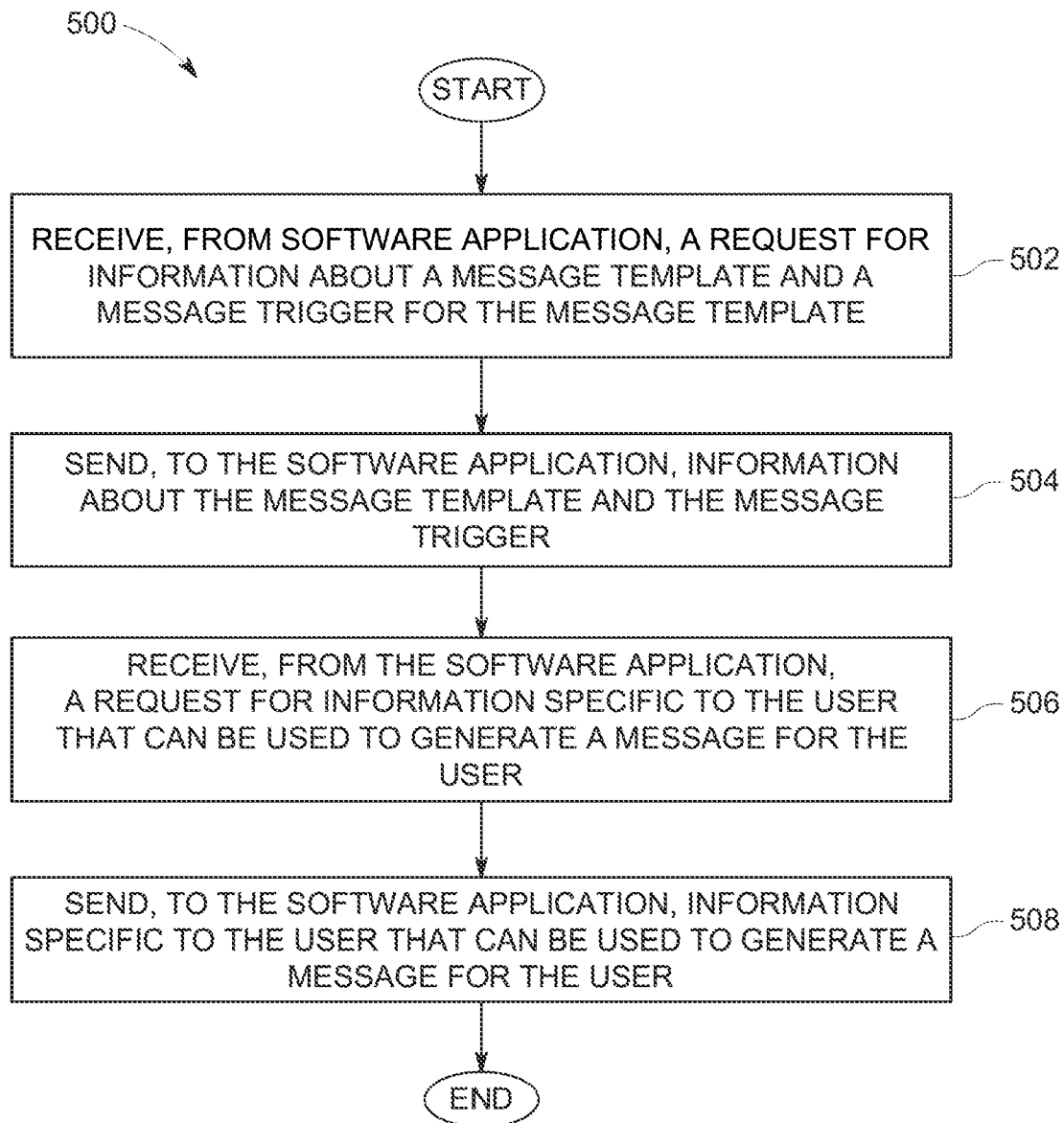
FIG. 5 is a flowchart illustrating steps of another method embodying the invention that would be performed by elements of a customer engagement service.

In the following descriptions we will first discuss how in-application messages can be delivered to users via various different methods. Next, we will discuss how correlations between user computing devices and video display devices can be generated, updated and confirmed. Then we will discuss how a customer engagement service can make use of correlations between user computing devices and video display devices to provide an enhanced user experience. As is apparent from the description provided above, the process of generating and delivering an in-application message to a user via a client's software application requires the coordinated efforts of elements of the customer engagement service 50 and elements of the client's software application 300. FIG. 4 depicts a flowchart that shows the actions of the in-application messaging module 304 of the client's software application 300 during this process, according to a first way of operating. FIG. 5 illustrates a flowchart that shows the actions of elements of the customer engagement service 50 during this process, according to this first way of operating. Thus, FIGS. 4 and 5 will be used together to describe this process, according to the first way of operating.

It is also worth noting that in order to enable the client's software application 300 to operate as outlined above, the client's software application 300 incorporates software provided by the customer engagement service 50. Modification of the client's software application 300 could be performed by the client or by the customer engagement service 50 using a software development kit (SDK) provided by the customer engagement service 50, or via alternate means. Once the client's software application 300 has been modified so that it can interact with the customer engagement service 50 to deliver in-application messages to the user of the software application 300, the software application 300 may make calls to an application programming interface (API) provided by the customer engagement service 50 to obtain various items of information from the customer engagement service 50.

Likewise, a client's software application 300 may be modified by a software development kit provided by the customer engagement service 50 so that it reports usage information directly to a correlation unit 230 of the customer engagement service to help correlate user computing devices to video display devices. Also, the modification to the customer's software application 300 allows the software application to perform correlation confirmation procedures, as discussed in more detail below.

The method depicted in FIGS. 4 and 5 begins when a client's software application 300 is first run by a user on one of the user's computing devices. One of the startup functions performed by the software application 300, as illustrated in step 402, is for the messaging module 304 of the software application 300 to request a message template for a message and information about trigger conditions for the message from the in-application messaging unit 228 of the customer engagement service 50. As noted above, a message template could include blank portions that are to be filled with customer-specific information, which allows the message to personalized or customized for the user. A message template could also include sections that will be completed or filled in by evaluating conditional statements or boolean logic-based statements. The conditional statements or boolean logic-based statements can seek information from the customer engagement service, the client that provided the software application or from a third-party source in order to determine whether and/or how to complete that portion of the message template.

As also noted above, conditional statement and/or boolean logic-based statements could determine whether a message is to be displayed to the user. For example, a message template may include a conditional statement or boolean logic-based statement that indicates that under certain conditions the message should be displayed to the user, and under certain other conditions the message should not be displayed to the user.

Next, in step 502 of the method illustrated in FIG. 5, the in-application messaging unit 228 of the customer engagement service 50 receives the request from the in-application messaging module 304. The in-application messaging unit 228 identifies a message that is to be delivered to the user of the software application, and in step 504 the in-application messaging unit 228 sends a template for the message to the messaging unit 312 of the software application 300. The in-application messaging unit 228 also sends information about trigger conditions for the message to the message trigger acquisition unit 308 of the software application 300.

Next, in step 404 of the method illustrated in FIG. 4, the messaging unit 312 receives the message template and the message trigger acquisition unit 308 receives the information about the trigger conditions for the message. The trigger monitoring unit 310 then monitors the trigger conditions until, in step 406, the trigger monitoring unit 310 determines that the message trigger conditions have been satisfied.

Next, in step 408, the user-specific information acquisition unit 314 requests user-specific information from one or more remote servers. That request could also include information about the trigger event that just transpired, such as how the message trigger was satisfied. The user-specific information sought will depend on the message template.

For example, in some instances the user-specific information acquisition unit 314 could be seeking simple user characteristic data, such as a user's name or address. In other instances, the user-specific information acquisition unit 314 may need to evaluate one or more conditional statements or boolean logic-based statements to determine what user-specific information to request, or where to direct such a request. Evaluating a conditional statement or a boolean logic-based statement may require obtaining one or more first items of information and using those first items of information to evaluate the conditional statement or boolean logic-based statement. Once that has been accomplished, the result may cause the user-specific information acquisition unit 314 to then seek out additional information that ultimately will be used to generate the message that is to be displayed or played to the user. Thus, the process of obtaining user-specific information that is to be inserted into a single portion of a message template may be a multi-step process that requires the user-specific information acquisition unit 314 to interact with multiple data sources to acquire all of the information or data that is ultimately inserted into the single portion of the message template. As noted above, the evaluation of these conditional statements and/or boolean logic-based statements would only be performed after the message trigger conditions have been satisfied, using then-current information.

When the user-specific information acquisition unit 314 requests data to help generate a message, the remote server to which the information request is directed could be the server hosting the in-application messaging unit 228 of the customer engagement service 50. Alternatively, the request could be sent to a server hosting the user information unit 210 maintained by the customer engagement service 50. In other instances, the request could be directed to a remote server that hosts customer information databases maintained by the client that provided the software application 300. In still other instances, the request could be directed to a remote server of a third-party user information service.

Depending on the message trigger, the request that the user-specific information acquisition unit 314 sends for user-specific data may also include information about how the message trigger was satisfied. For example, a message template sent to the in-application messaging module 304 could have a trigger that indicates that the message should be displayed to the user after the user watches a video. When the user watches a video, the user-specific information acquisition unit 314 could send a request for information that also indicates which video the user just watched. And the type of information sent back to the messaging unit 312 for insertion into the message template could vary greatly depending on the nature of the video that the user just watched. In still other embodiments, conditional statements or boolean logic-based statements in the message template itself might result in the user-specific information acquisition unit 314 requesting different types of information, or directing the request to different sources, depending on the nature of the video that the user just watched.

For purposes of this explanation, we will assume that the user-specific information acquisition unit 314 directed the information request to a remote server maintained by the customer engagement service 50. As a result, in step 506 of the method illustrated in FIG. 5, the information request is received by the customer engagement service 50. Next, in step 508, an element of the customer engagement service 50 obtains the requested user-specific information and sends it to the user-specific information acquisition unit 314. At this point, the method illustrated in FIG. 5 would end, and the in-app message would ultimately be delivered to the user via the software application 300 without further involvement of the customer engagement service 50.

Next, in step 410, the user-specific information acquisition unit 314 of the software application receives the requested user-specific information. In step 412, the message generation unit 316 uses the message template and the user-specific information to generate the in-application message. Finally, in step 414, the message display unit 318 causes the in-application message to be displayed/played to the user. The method illustrated in FIG. 4 would then end.

In the foregoing description, only a single message template and associated information about trigger conditions was sent to the software application 300 during startup. In alternate embodiments, multiple message templates and associated information about trigger conditions could be sent to the software application 300 upon startup.

In addition, the in-application messaging module 304 of the software application 300 may request message templates and associated information about trigger conditions from the customer engagement service 50 at other times. For example, such a request might be sent from the in-application messaging module 304 to the customer engagement service 50 on a periodic basis. Also, an element of the software application 300 may be configured to cause such a request to be sent to the customer engagement service 50 upon the occurrence of a triggering event.

In still other embodiments, the in-application messaging unit 228 of the customer engagement service 50 may be configured to push message templates and associated information about trigger conditions to the in-application messaging module 304 of a software application 300. Thus, rather than waiting for a request from the software application 300, the in-application messaging unit 228 of the customer engagement service 50 may be capable of proactively sending such information to a client's software application 300.

Also, in the embodiment described above, the user-specific information acquisition unit 314 requested up-to-date user-specific information that was to be added to a message template to generate an in-application message. In alternate embodiments, the information acquired by the messaging unit 312 that is added to a message template to create an in-application message need not be specific to the user. Instead, it may be desirable to simply acquire up-to-date information unrelated to the user that is to be loaded into a message template to create an in-application message. Here again, the information obtained and used to create an in-application message could come from a variety of sources beyond databases maintained by the customer engagement service 50 of the client that provided the software application 300.

Figure 6:
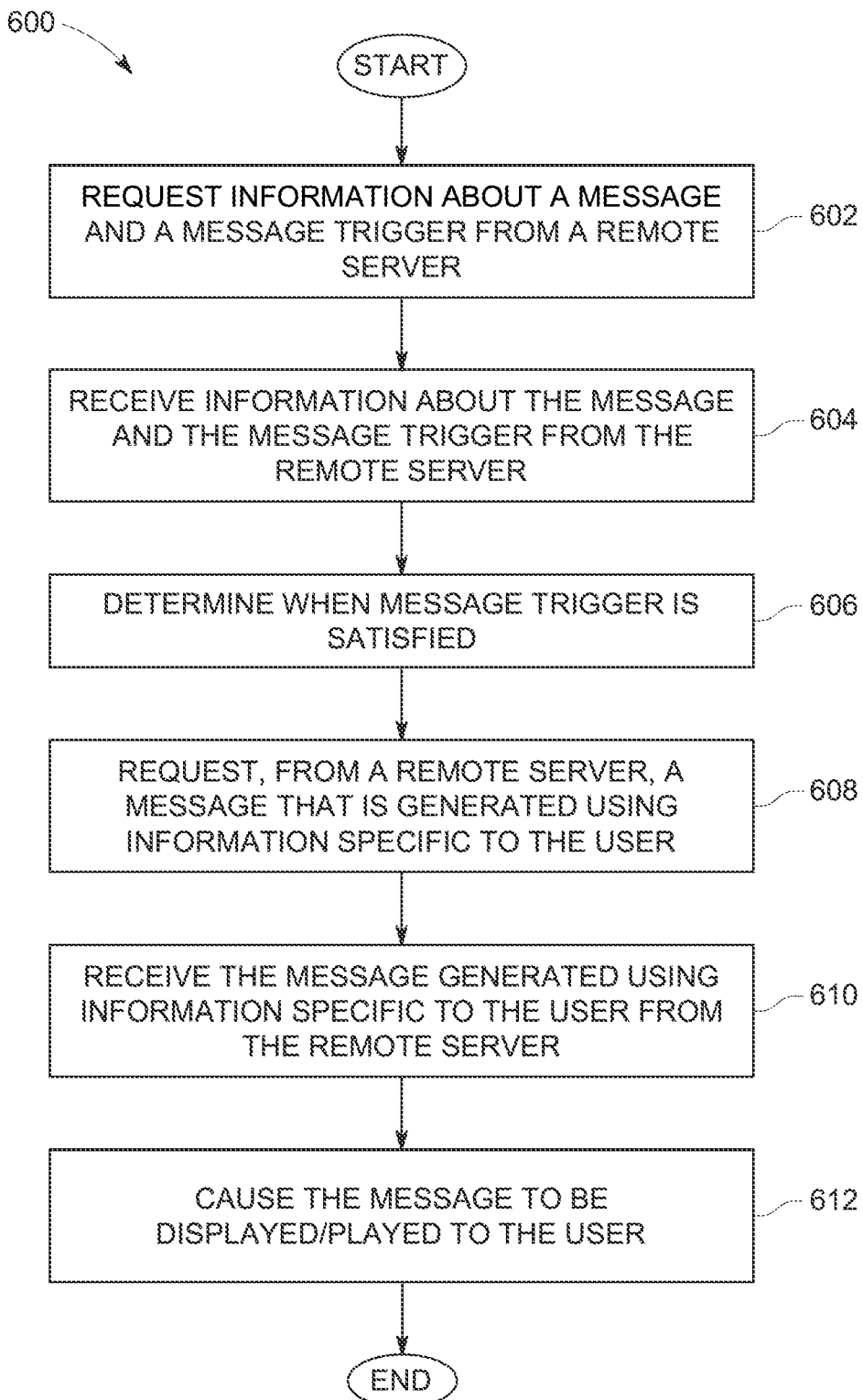
FIG. 6 is a flowchart illustrating steps of another method embodying the invention that would be performed by elements of a company's software application.
Figure 7:
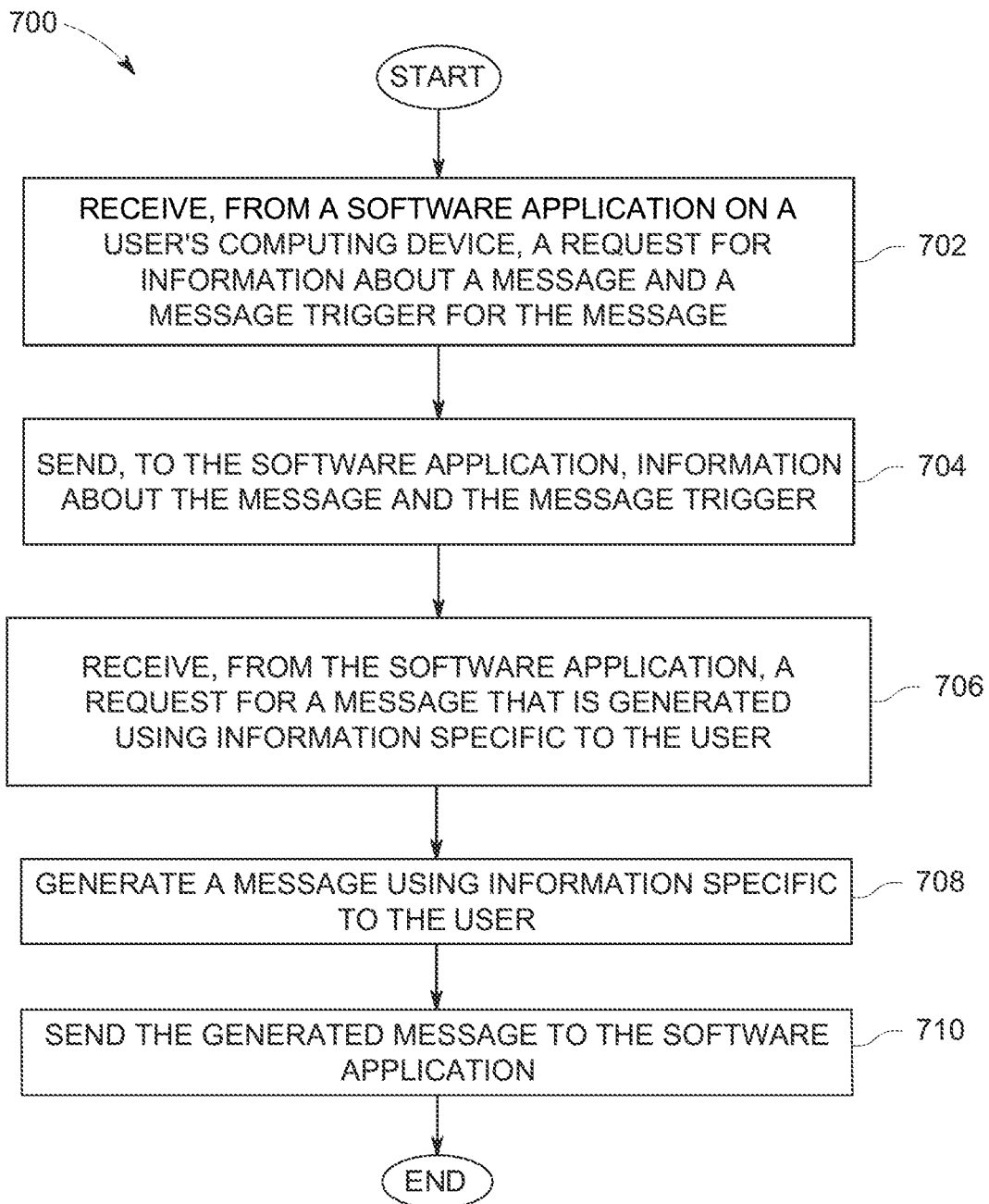
FIG. 7 is a flowchart illustrating steps of another method embodying the invention that would be performed by elements of a customer engagement service.

FIGS. 6 and 7 illustrate steps of methods for delivering in-application messages to users that operates somewhat differently from the one discussed above. FIG. 6 illustrates steps that would be performed by an in-application messaging module 304 of a client's software application 300. FIG. 7 illustrates steps of a method that would be performed by elements of a customer engagement service 50.

In this method, when the client's software application is first run, as part of the startup operations, in step 602, a messaging module 304 of the software application 300 requests information about a message and trigger conditions for the message from a remote server. For purposes of this embodiment, we will assume that the request is sent to an in-application messaging unit 228 of a customer engagement service 50.

Next, in step 702 of the method illustrated in FIG. 7, the in-application messaging unit 228 receives the request sent by the messaging module 304. The in-application messaging unit 228 identifies a message that is to be delivered to a user of the software application 300, and in step 704 the in-application messaging unit 228 sends information about the message to the messaging unit 312 and information about the associated trigger conditions to the message trigger acquisition unit 308 of the software application 300.

In step 604 of the method illustrated in FIG. 6, the message trigger acquisition unit 308 receives the information about the message trigger conditions, and the messaging unit 312 receives information about the message. Next, in step 606, the trigger monitoring unit 310 monitors the trigger conditions until it determines that the trigger conditions have been satisfied.

In step 608, the messaging unit 312 requests a message with up-to-date user-specific information from the in-application messaging unit 228 of the customer engagement service 50. The request may include information about how the trigger condition was satisfied. In step 706 of the method illustrated in FIG. 7, that request is received by the in-application messaging unit 228 of the customer engagement service 50. In step 708, the in-application messaging unit 228 generates a message with up-to-date customer-specific information. This up-to-date customer-specific information could be drawn from the databases 214 in the user information unit 210 of the customer engagement service 50, or from user information databases maintained by the client that provided the software application 300, or from other third-party sources. In step 710, the in-application messaging unit 228 sends the generated message to the messaging unit 312 of the software application 300. The method illustrated in FIG. 7 then ends, and the customer engagement service is not further involved in delivering the in-application message to the user of the software application 300.

In step 610 of the method illustrated in FIG. 6, the messaging unit 312 of the software application 300 receives the generated message. Then, in step 612, the message display unit 318 causes the generated message to be displayed or played to the user. The method illustrated in FIG. 6 then ends.

In the foregoing description, information about only a single message, and associated information about trigger conditions, was sent to the software application 300 during startup. In alternate embodiments, information about multiple messages and associated trigger conditions could be sent to the software application 300 upon startup.

In addition, the in-application messaging module 304 of the software application 300 may request information about one or more messages and associated trigger conditions from the customer engagement service 50 at other times. For example, such a request might be sent from the in-application messaging module 304 to the customer engagement service 50 on a periodic basis. Also, an element of the software application 300 may be configured to cause such a request to be sent to the customer engagement service 50 upon the occurrence of a triggering event.

In still other embodiments, the in-application messaging unit 228 of the customer engagement service 50 may be configured to push information about messages and associated trigger conditions to the in-application messaging module 304 of a software application 300. Thus, rather than waiting for a request from the software application, the in-application messaging module 228 of the customer engagement service 50 may be capable of proactively sending such information to a client's software application 300.

Also, in the embodiment described above, the in-application messaging unit 228 used user-specific information to generate the in-application message that is ultimately displayed/played to the user. In alternate embodiments, the information used to create an in-application message need not be specific to the user. Instead, it may be desirable to acquire up-to-date information unrelated to the user, and then use that information to generate the in-application message. Here again, the information obtained and used to create an in-application message could come from a variety of sources beyond databases maintained by the customer engagement service 50 of the client that provided the software application 300.

In the methods described above, the trigger monitoring unit 310 determined when all the trigger conditions associated with a message are satisfied such that the messaging unit 312 could proceed to generate or obtain an in-application message and then present the in-application to the user. In the past, the trigger monitoring unit 310 was only able to monitor trigger conditions that could be identified via the capabilities of the software application or via the capabilities of the user computing device upon which the software application is running. As a result, when a remote server generated information relating to a trigger condition, there was no way for the trigger monitoring unit 310 to become aware of that information. Consequently, in the past it was only possible for the in-application messages to utilize trigger conditions that could be identified as having been satisfied using the capabilities of the software application or the user computing device upon which the software application 300 is running.

Figure 8:
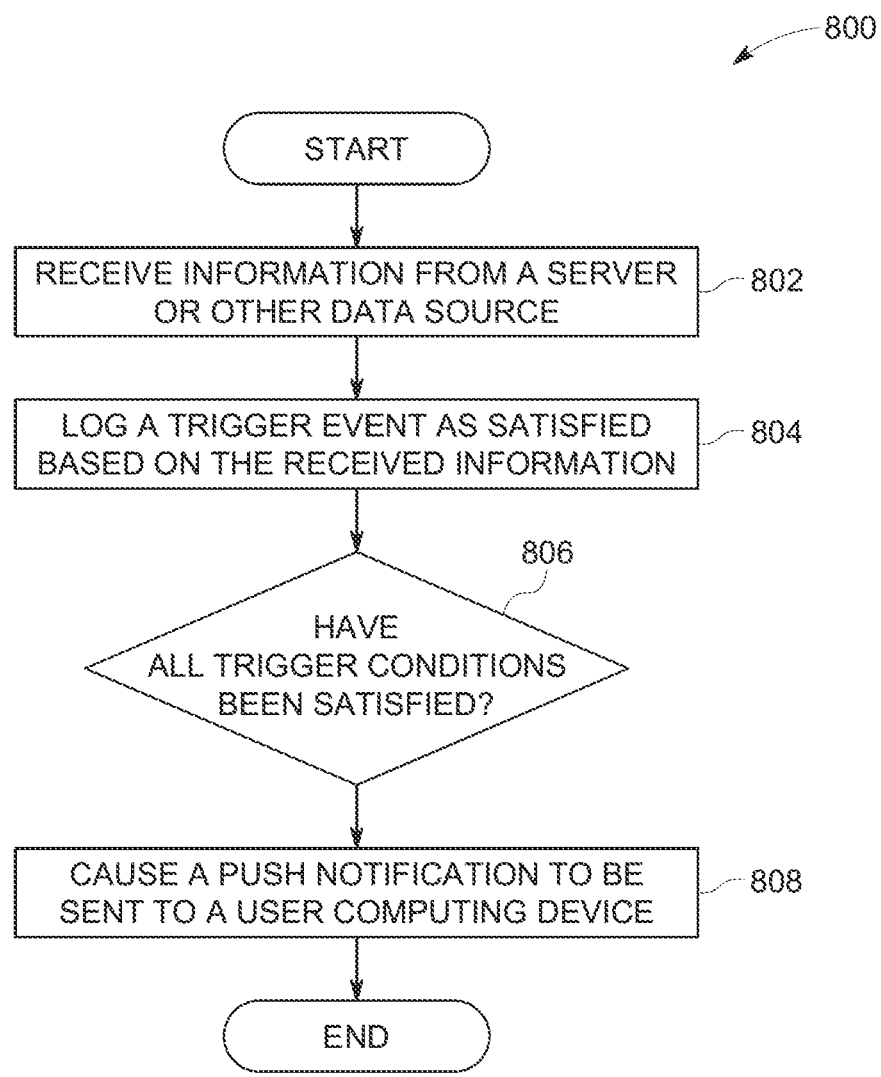
FIG. 8 is a flowchart illustrating steps of a method embodying the invention that would be performed by elements of customer engagement service.
Figure 9:
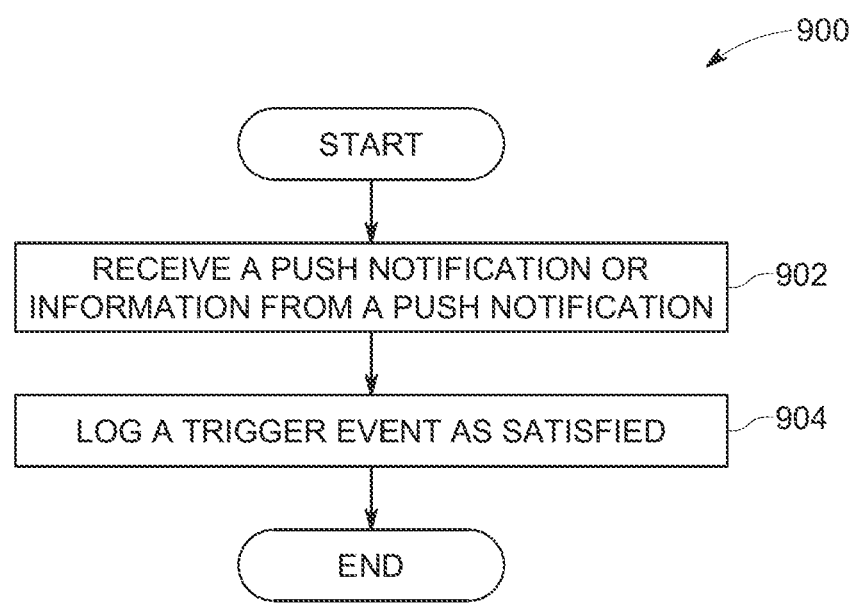
FIG. 9 illustrates steps of a method embodying the invention that would be performed by elements of a software application on a user computing device.

To overcome the drawback noted above, the inventors devised new methods that allow the trigger monitoring unit 310 to determine that a trigger condition has been satisfied using information that has been generated or reported from a remote server. These new methods are discussed in conjunction with FIGS. 8 and 9. FIG. 8 is a flowchart that illustrates steps of a method that would be performed by elements of a customer engagement service 50 as part of this process. FIG. 9 is a flowchart illustrating steps of a method that would be performed by elements of a software application running on the user's computing device.

Information relevant to message trigger conditions can be generated by client computer systems or servers, or by third-party computer systems or servers. For example, if a user makes a purchase from a client, the client's computer system could send information about that purchase to the data receiving unit 212 of the customer engagement service 50. The purchase activity could be a trigger for sending an in-application message to the user. Of course, information reported from a client's computer systems or from a third party that is indicative of a trigger condition being satisfied need not relate to user activities. Instead, the information could be indicative of other sorts of trigger conditions being satisfied.

Before the methods illustrated in FIGS. 8 and 9 would be performed, a client or the customer engagement service 50 would configure a first campaign that would be designed to cause an in-application message to be presented to a user when one or more trigger conditions have been satisfied. This first message campaign would be implemented by a software application 300 on a user's computing device. At least one of the trigger conditions would relate to information that will be reported by a third-party server. The third-party server reporting the information related to the trigger condition could be a server operated by the client that provided the user with the software application 300. Alternatively, the third-party server reporting the information related to the trigger condition could be unrelated to the client or the customer engagement service 50. Information about the in-application message would be provided to the messaging unit 312 of the software application 300, and information about the trigger conditions that must be satisfied would be provided to the message trigger acquisition unit 308, in keeping with the methods discussed above.

The client or the customer engagement service 50 would also configure a second campaign that will implemented by the message sending unit 220 of the customer engagement service 50. This second campaign will cause a push notification to be sent to the user computing device hosting the software application 300 when one or more trigger conditions are satisfied. At least one of those trigger conditions includes receiving certain information from a third-party server at the data receiving unit 212 of the customer engagement service 50. In some instances, only a single piece of information from a single third-party server need be received before the campaign will cause a push notification to be sent to the user's computing device. In other instances, the campaign may be configured such that multiple items of information must be received from one or more third-party servers before the push notification is sent to the user's computing device. In still other instances, the campaign may be configured such that information must be received from a third-party server, and other trigger conditions unrelated to information sent from a third-party server must be satisfied before the push notification is sent to the user's computing device. With that as background, we will now proceed to a discussion of the methods illustrated in FIGS. 8 and 9.

The method 800 illustrated in FIG. 8, which is performed by elements of a customer engagement service, begins and proceeds to step 802, where the data receiving unit 212 of the customer engagement service 50 receives information from a third-party server that relates to a trigger condition for both the first campaign being implemented by the software application 300, and the second campaign being implemented by the message sending unit 220. That information is reported to the in-application messaging unit 228, which in step 804 logs the related trigger condition as having been satisfied.

In step 806 the in-application messaging unit 228 determines whether all of the trigger conditions for the second campaign being implemented by the message sending unit 220 have been satisfied. If not, the method waits until all the trigger conditions for the second campaign have been satisfied. When all the trigger conditions for the second campaign have been satisfied, the method proceeds to step 808 where the push notification sending unit 221 causes a push notification service 40/42 to send a special push notification to the user's computing device. The method then ends.

The special push notification sent to the user's computing device is designed to inform the trigger monitoring unit 310 of the software application that a trigger condition relating to the first campaign being implemented by the software application 300 has been satisfied. In some embodiments, the push notification would be a silent push notification that is not displayed to the user in any fashion. In other instances, the push notification may be one that is displayed to the customer in some fashion.

In the example provided above, information relating to a trigger condition for a campaign is received from a third-party server. However, in alternate embodiments, the information could be generated or determined internally by one or more elements of the customer engagement service itself.

The method 900 illustrated in FIG. 9, which is performed by the software application 300 running on the user's computing device, will not begin until after the push notification sent during performance of the method illustrated in FIG. 8 has been received by the user's computing device. The method 900 illustrated in FIG. 9 then begins and proceeds to step 902 where the push notification receiver 303 of the software application 300 receives the push notification, or information extracted from the push notification, from elements of the user's computing device. This assumes that the software application 300 is loaded and running at the time that the push notification is received by the user's computing device. If the software application 300 is not running when the push notification is received by the user's computing device, the user's computing device may store the push notification and then pass the push notification, or information extracted from the push notification, on to the push notification receiver 303 the next time that the software application 300 is loaded and run.

The method then proceeds to step 904 where the trigger monitoring unit 310 logs a trigger condition for the first campaign as satisfied. This can occur because the push notification receiver 303 recognizes certain information or codes or meta data in the received push notification that cause the push notification receiver 303 to instruct the trigger monitoring unit 310 to log a particular trigger condition as satisfied. Alternatively, the push notification receiver 300 may simply extract certain information from the received push notification and pass that extracted information on to the trigger monitoring unit 310. The trigger monitoring unit 310 would then examine the extracted information and determine that a particular trigger condition for the first campaign has been satisfied, and then log the trigger condition as satisfied.

Once the trigger condition has been logged as satisfied, the method will end. However, one should note that the method being performed in FIG. 9 is only designed to let the software application 300 know that a trigger condition for the first campaign being implemented by software application 300 has been satisfied. Thus, the method illustrated in FIG. 9 is essentially a part of performing step 406 of the method illustrated in FIG. 4, or a part of performing step 606 of the method illustrated in FIG. 6.

A messaging unit 312 of a software application 300 running on a user computing device may have information about multiple different in-application messages that can be presented to a user when the trigger conditions for those in-application messages are satisfied. The push notification that is sent to the user's computing device can include information or codes that indicate that a specific trigger for a specific in-application message is to be logged as satisfied.

The methods discussed above in connection with FIGS. 8 and 9 provide a way for a campaign being implemented by a software application on a user computing device to determine that a trigger condition for an in-application message has been satisfied based on information that was reported by a third-party server.

Figure 10:
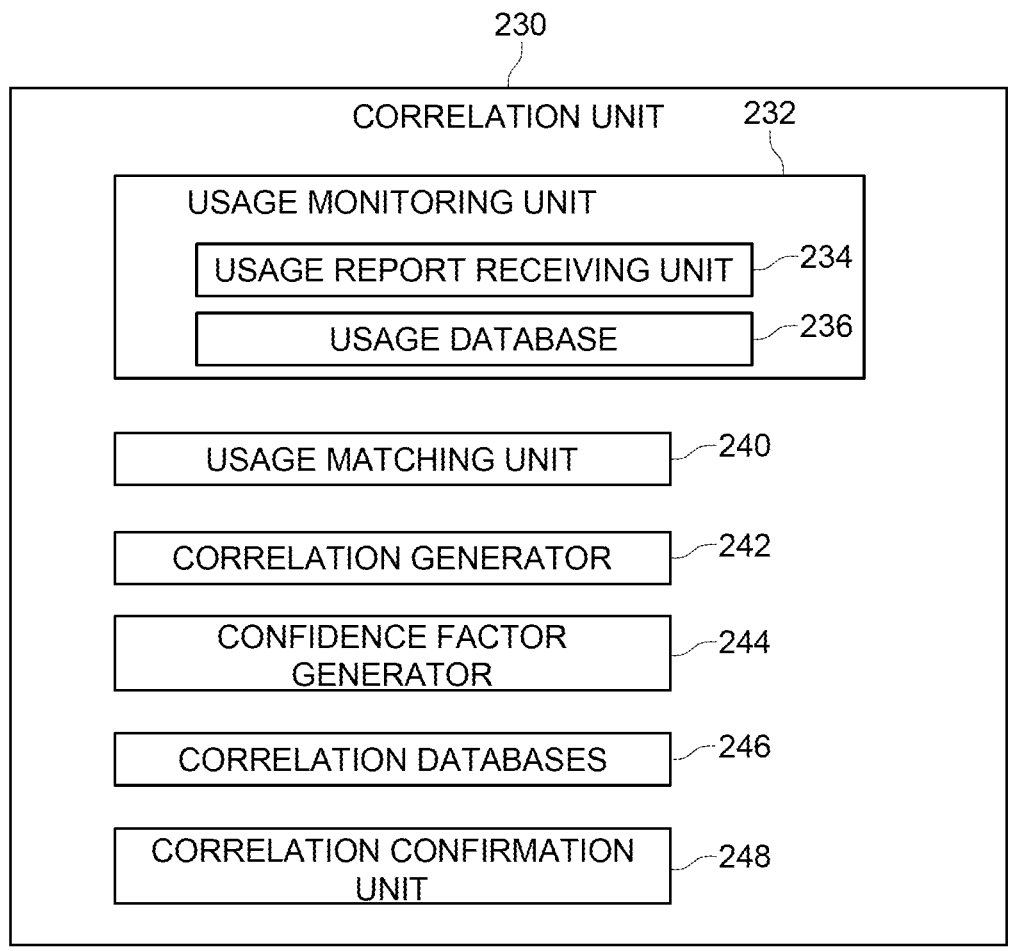
FIG. 10 is a diagram of a correlation unit that is configured to establish correlations between user computing devices and video display devices.

FIG. 10 illustrates various elements of a correlation unit 230 of a customer engagement service 50 that is configured to generate, update and confirm correlations between user computing devices and video display devices. The correlation unit 230 includes a usage monitoring unit 232 that obtains information about usages of computer programs 300 installed on user computing devices and video display devices. The usage monitoring unit 232 includes a usage report receiving unit 234 that receives reports about usages of computer programs 300 and usage databases 236 in which this usage information is recorded.

The usage report receiving unit 234 may receive a computing device usage report that includes information about a user or customer's use of a computer program on a user computing device. The user computing device could be, for example, a desktop or laptop computer, a smartphone or a tablet computing device. A computing device usage report could be received directly from a user or customer computing device, or information about usage of a software application on a user computing device could be obtained from a data receiving unit 212 or databases 314 of a user information unit 210 of the customer engagement service 50. A computer device usage report would typically include the start time and end time at which a user interacted with a software application 300 on the user computing device, those starting and ending times defining a session. A computer device usage report would also typically include some form of identifying information relating to an access point device that the user computing device was using to communicate over a data network such as the Internet. The identifying information could take many forms, but is intended to uniquely identify the access point device.

For example, a computer device usage report could include the IP address used by a wired or wireless access point that provides the user computing device with access to a data network such as the Internet 22. In other instances, the identifying information could be a media access control (MAC) address assigned to the wired or wireless access point. In some instances, the identifying information could be the service set identification (SSID) of a wireless network that the user computer device is using to access a data network and which is created by the wired or wireless access point. In still other instances, some other form of identifying information could be obtained and included in usage reports sent to the usage report receiving unit 234. The point of including this information is to uniquely identify the wired or wireless access point of wireless network that the user computer device is using to access a data network.

Typically, a software application 300 running on a user computer device will be able to obtain the forms of identifying information outlined above. The usage reporting unit 322 of the software application 300 can then include the identifying information in usage reports sent to the usage report receiving unit 234. The usage monitoring unit 232 also receives video display device usage reports from software applications on video display devices. As noted above, a client of the customer engagement service may also provide a software application 300 that is loaded and run on a video display device. That client software application 300 is configured to provide video display device usage reports to the usage report receiving unit 324 or the data receiving unit 212 of the customer engagement service. Those usage reports can also include the start and ending times of sessions when the software application was active on the video display device. The usage reports can also include the same types of identifying information discussed above, which are intended to uniquely identify the wireless network or wired or wireless access point that the video display device is using to access a data network such as the Internet. Also, the usage monitoring unit 232 may obtain this same type of usage information from the data receiving unit 212 or databases 214 of the user information unit 210 of the customer engagement service 50.

The usage reports received by the usage monitoring unit 232 of the correlation unit 230 would also provide an indication of the type of device that sent the usage report. For example, computing device usage reports received from a user's computing device will indicate that they originated from a user computing device. A computing device usage report may include even more specific information identifying the exact type of user computing that generated the computing device usage report. Similarly, video display device usage reports will indicate that they originate from a video display device, and video display device usage reports may further indicate the exact type of the video display device that generated the report.

The correlation unit 230 also includes a usage matching unit 240 that attempts to correlate the activities of a user computing device and a video display device. One way this is accomplished is by matching the identifying information and session information contained within computer device usage reports and video display device usage reports.

For example, it is common for both a user computing device and a video display device located in the same residence or business to obtain access to a data network such as the Internet from the same access point device. When this happens, usage reports from the user computing device and usage reports from the video display device will include the same type of identifying information that uniquely identifies the wireless network and/or the wired or wireless access point that both the user computing device and the video display device are using to access to the data network. At a minimum, this indicates the user computing device and the video display device are located in the same residence or business.

The usage matching unit 240 may also compare the start and ending times of reported sessions on the user computing device and the video display device to determine if the sessions coincided, or at least overlapped. When a computer device usage report and a video device usage report indicate that both devices were using the same wireless network or the same wired or wireless access point to access the data network at the same times, it can indicate that a customer was using the user computing device at the same time that the customer was viewing content on the video display device. The more the start and ending times of the respective sessions overlap, the stronger the possibility that the customer was utilizing the computing device at the same time that the customer was viewing video content on the video display device.

For example, and with reference to FIG. 1, the usage matching unit 240 can review computing device usage reports and video display device usage reports for the video display device 82 located in the first residence to identify those user computing devices that report using the same wireless network and/or the same wired or wireless access point as the first video display device 82. If the usage matching unit 240 identifies a user computing device that regularly uses the same wireless network and/or the same wired or wireless access point to access a data network as the video display device 82 in the first residence 80, it indicates that the user computing device is at least regularly present in the first residence 80. The more often the usage reports indicate that the user computing device and a video display device used the same wireless network and/or the same wired or wireless access point IP address to access a data network, the more likely it is that the user of the computing device regularly watches video content on the video display device 82. Also, the more closely the session times of the respective usage reports overlap, the more likely it is that the user of the computing device regularly watches video content on the video display device 82. Based on this information, a correlation generator 242 of the correlation unit 230 can identify a correlation between the user computing device and the video display device 82.

The usage matching unit 240 could also analyze user computing device usage reports and video display device usage reports to draw more detailed conclusions about how certain video display devices are being used. For example, recall that the second residence 60 depicted in FIG. 1 includes both a first video display device 62 located in a common area of the residence, and a second video display device 66 that is located in a bedroom of the residence.

When the usage matching unit 240 reviews user computing device usage reports and video display device usage reports that all indicate usage of the same wireless network and/or the same wired or wireless access point, the usage matching unit 240 may find that three different user computing devices regularly report using that wireless network or access point and report usage sessions that that overlap in time with sessions reported by the first video display device 62. The usage matching unit 240 may also determine that only the first of the three user computing devices report usage sessions that use that wireless network or access point and report usage sessions that overlap in time with usage sessions reported by the second video display device 66. Based on this information, one could infer that three individuals possessing the three user computing devices regularly or occasionally watch video on the first video display device 62 because it is located in a common area of the second residence 60. One could also infer that the second video display device 66 is located in a bedroom or office that only the individual possessing the first of the three user computing devices uses.

From this information, the correlation generator 242 could create correlations between the first video display device 62 and all three of the user computing devices. The correlation generator 242 could also generate a correlation between the first of the three user computing devices and the second video display device 66 in the second residence 60.

The correlation unit 230 also includes a confidence factor generator 244 that generates a confidence factor for a correlation between a user computing device and a video display device. As mentioned above, the more frequently that a user computing device and a video display device report using the same wireless network and/or the same wired or wireless access point, the more likely the user of the computing device watches video on the video display device. Similarly, the more often the session times of the user computer device and the video display device overlap, the more likely the user of the computing device watches video on the video display device. Also, the greater the degree of overlap between the session times, the more likely the user of the computing device watches video on the video display device. All of these factors could be used by the confidence factor generator 244 to generate a confidence factor for a correlation between a user computer device and a video display device.

The correlations generated by the correlation generator 242 and the associated confidence factors generated by the confidence factor generator 244 are stored in one or more correlation databases 246. The information in the correlation databases 246 can then be used to determine how and when to present certain messages to users or customers via their associated user computing devices and their associated video display devices.

The correlation unit 230 also includes a correlation confirmation unit 248 that could act in some instances to attempt to confirm a suspected correlation between a user computing device and a video display device. For example, if the correlation generator suspects that a user of a certain computing device watches video content on a particular video display device, the next time that both the user computing device and the video display device report an active session using the same IP address, the correlation confirmation unit 248 can cause the correlation confirmation unit 324 of a software application 300 on the user computing device to present the user with a message that asks the user to indicate if the user is watching the video content currently being displayed on the video display device. If the user responds affirmatively, the correlation confirmation unit 324 of the software application 300 on the user computing device reports the affirmative answer to the correlation confirmation unit 248 of the correlation unit 230. The correlation confirmation unit 248 would then conclude that the correlation between the user computing device and the video display device is a valid correlation. The validity of the correlation could then be recorded in the correlation databases 246.

As another example, assume that the name of the individual possessing the user computing device is known. In that instance, the correlation confirmation unit 248 of the correlation unit 230 could cause the correlation confirmation unit 324 of a software application on the video display device to present on the display screen a message asking if the viewer of the video program is the name of the individual that possesses the user computing device. The user could respond affirmatively or negatively using an input device associated with the video display device. The user's response would then be sent from the correlation confirmation unit 324 of the software application on the video display device to the correlation confirmation unit 248 of the correlation unit 230. If the user responded affirmatively, the correlation confirmation unit 248 would determine that the correlation between the user computing device and the video display device is valid, and this information could be recorded in the correlation databases 246.

Figure 11:
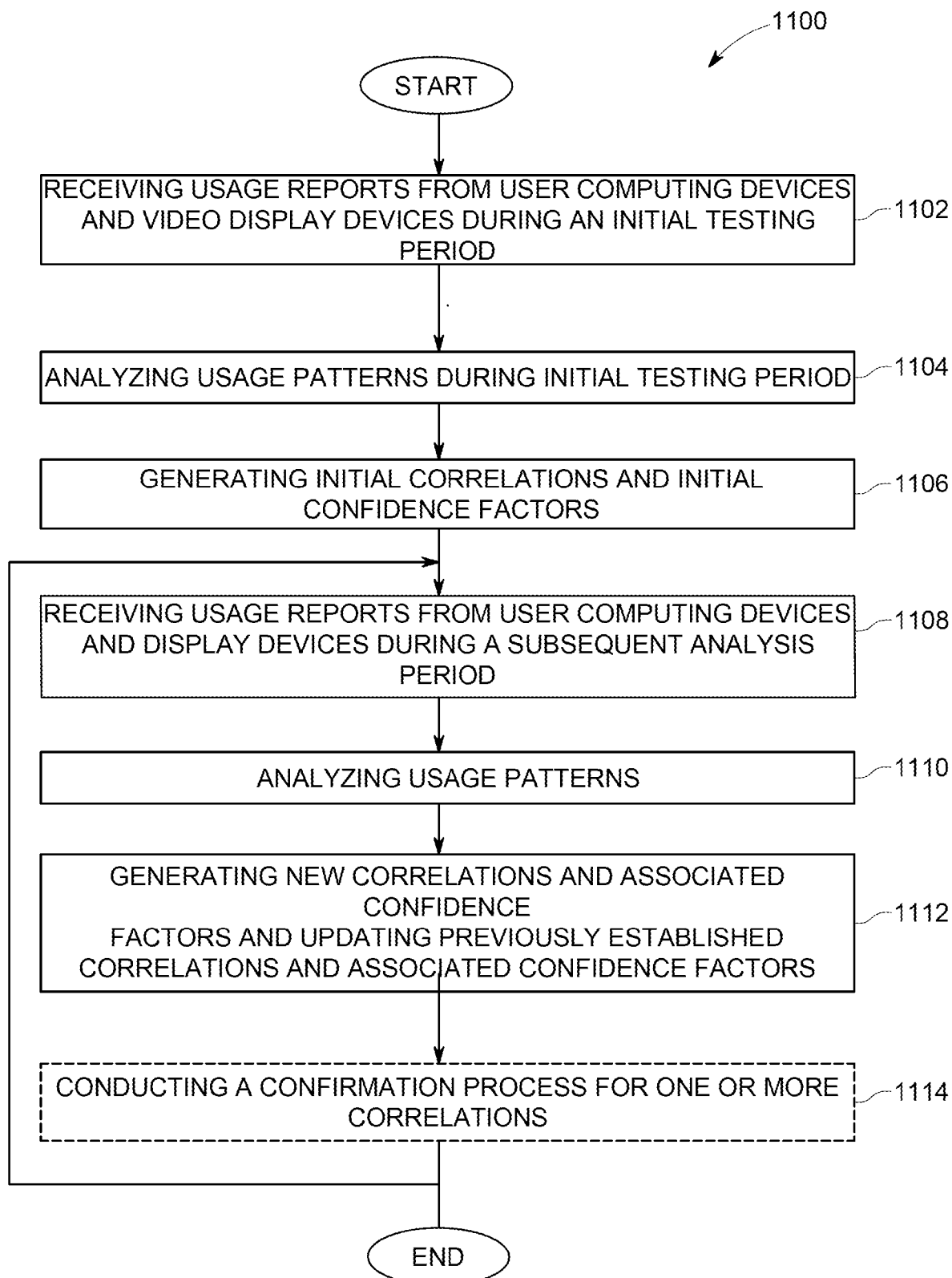
FIG. 11 is a flowchart illustrating steps of a method of generating and updating correlations between user computing devices and video display devices.

FIG. 11 depicts steps of a method that would be performed by elements of a customer engagement service 50 to generate and possibly confirm a correlation between a user computing device and a video display device. The method 1100 begins and proceeds to step 1102 where a usage monitoring unit 232 of a correlation unit 230 receives usage report information from user computing devices and video devices during an initial testing period. This could be an initial testing period when the correlation unit 230 is first activated. Alternatively, the testing period could be a testing period that corresponds to when a user computing device and/or a video display device first begin sending usage reports. As noted above, the usage monitoring unit 232 could receive such usage reports directly from the user computing devices and video display devices, or information from such usage reports could be provided by a user information unit 210 of the customer engagement service.

In step 1104, a usage matching unit 240 of the correlation unit 230 analyzes the usage report information acquired during the initial testing period to determine if there appear to be instances where one or more user computing devices report using the same wireless network and/or the same wired or wireless access point as one or more video display devices. If so, the usage matching unit 240 also compares the session times of such matching usage reports.

In step 1106, based on the analysis performed by the usage matching unit 240 in step 1104, a correlation generator generates an initial set of correlations between user computing devices and video display devices. Also, a confidence factor generator 244 generates one or more initial confidence factors for each of the initial correlations. The initial correlations and confidence factors are then stored in the correlation databases 246.

In step 1108, the usage monitoring unit 232 receives information from subsequently generated computer device usage reports and video display device usage reports during a subsequent analysis period. In step 1110, the usage matching unit 240 analyzes the usage information from the initial period and one or more subsequent analysis periods. Then, in step 1112, the correlation generator 242 and the confidence factor generator 244 update existing correlations and possibly create new correlations based on the analysis performed in step 1110. Any updated and new correlation information is then stored in the correlation databases 246.

The analysis performed in step 1110 could take into account the usage information developed during the initial testing period and all subsequent analysis periods. Alternatively, the analysis performed in step 1110 may be limited to a consideration of usage data for a predetermined period of time. For example, the analysis may only consider usage information obtained for the last X number of days or the last X number of weeks.

The method depicted in FIG. 11 could also include an optional step 1114 in which an attempt is made to confirm a correlation between a user computing device and a video display device. In optional step 1114, the correlation confirmation unit 248 can cause the correlation confirmation unit 324 of a software application 300 on a user computing device to present the user with a message that asks the user to indicate if the user is watching the video content currently being displayed on the corresponding video display device. If the user responds affirmatively, the correlation confirmation unit 324 of the software application 300 on the user computing device reports the affirmative answer to the correlation confirmation unit 248 of the correlation unit 230. The correlation confirmation unit 248 would then conclude that the correlation between the user computing device and the video display device is a valid correlation. The validity of the correlation could then be recorded in the correlation databases 246.

Alternatively, optional step 1114 could involve the correlation confirmation unit 248 of the correlation unit 230 causing the correlation confirmation unit 324 of a software application on the video display device to present on the display screen a message asking if the viewer of the video program is the name of the individual that possesses the corresponding user computing device. The user could respond affirmatively or negatively using an input device associated with the video display device. The user's response would then be sent from the correlation confirmation unit 324 of the software application on the video display device to the correlation confirmation unit 248 of the correlation unit 230. If the user responded affirmatively, the correlation confirmation unit 248 would determine that the correlation between the user computing device and the video display device is valid, and this information could be recorded in the correlation databases 246.

Regardless of whether optional step 1114 is performed, the method would then loop back to step 1108, and steps 1108-1112 would again be performed to update existing correlations and confidence factors and/or to generate new correlations and confidence factors. This process would repeat until the correlation unit ceases operations or until a system administrator halts the process.

Figure 12:
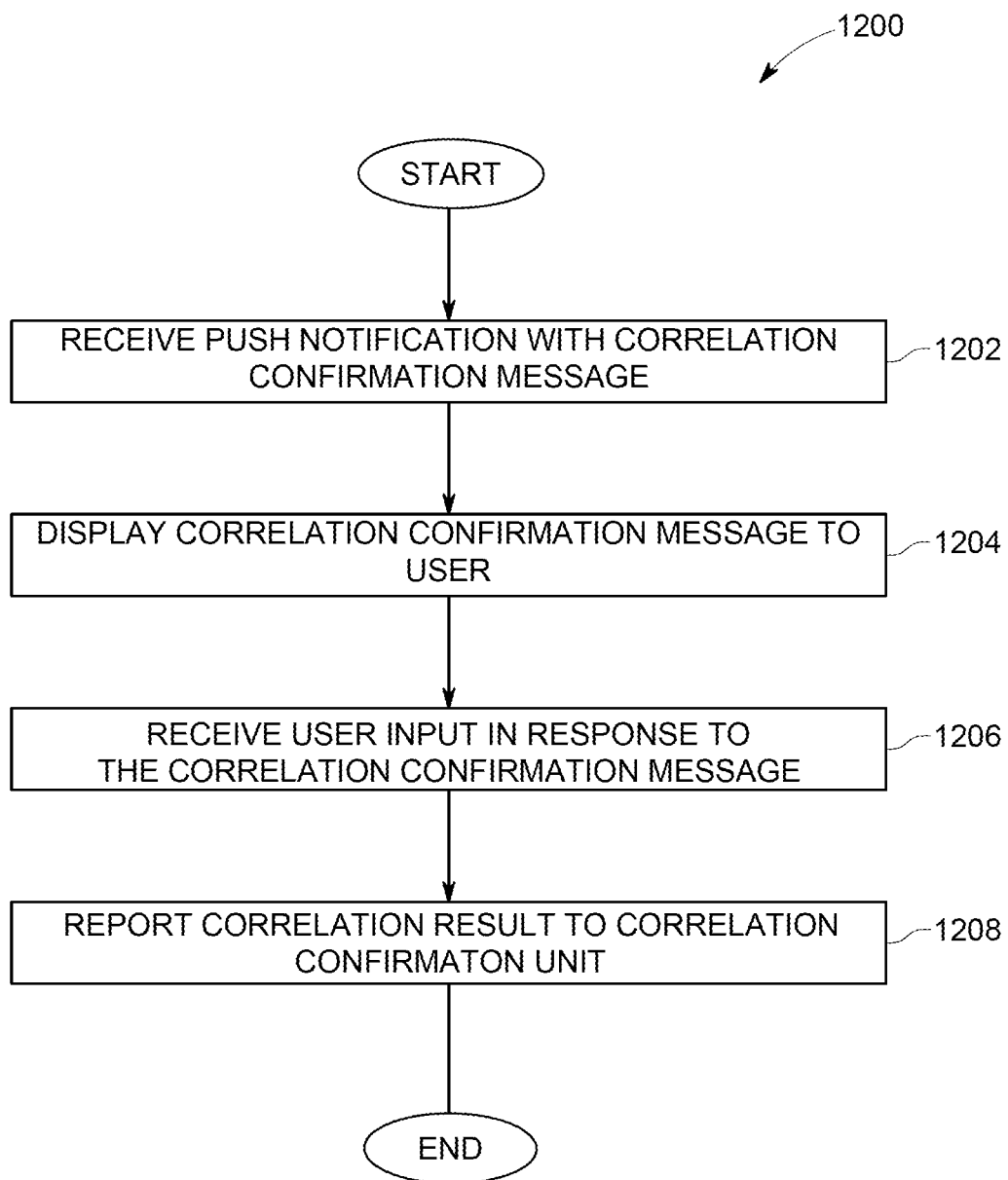
FIG. 12 is a flowchart illustrating steps of a method performed by elements of a software application on a user's computing device or on a video display device to help confirm a correlation between a user computing device and a video display device.

FIG. 12 illustrates steps of a method that would be performed by elements of a software application on a user computing device or a video display device to help conduct a correlation confirmation process. This confirmation process would be performed at a time when both the user computing device and the video display device in the correlation to be tested are both active and using the same wireless network and/or the same wired or wireless access point. The method 1200 begins and proceeds to step 1202 where the correlation assistance unit 320 of the software application 300 receives a push notification from a correlation confirmation unit 248 of a correlation unit 230 of a customer engagement service 50. The push notification includes information about a confirmation message that is to be presented to the user. In step 1204 the correlation confirmation unit 324 of the software application 300 causes the confirmation message to be displayed to the user. Using the examples already described above, if the software application 300 is resident on a user's computing device, the confirmation message could ask the user if the user is watching the video program currently being shown on the video display device. If the software application 300 is resident on a video display device, the video display device could display a message asking if the person viewing the video display device is the individual listed as the user of the user computing device.

Although this method involves the correlation assistance unit 320 receiving a push notification with information about the confirmation message, the information about the confirmation message could be sent to the software application 300 in alternate ways. For example, the confirmation message could be sent via a simple data communication that traverses a data network, such as the Internet.

In step 1206 the correlation confirmation unit 324 receives input from the user via the device upon which the software application 300 is running. In step 1208 the correlation confirmation unit 324 then sends the user input, or information based on the user input, to a correlation confirmation unit 248 of a correlation unit 230 of the customer engagement service 50. The method then ends.

Once a correlation between an individual user computing device and a video display device has been established, the customer engagement service can use the correlation in various ways to enhance the customer experience for a client's customer.

For example, assume that the user is watching a particular video program on the video display device. At an appropriate time during play of the video program, the customer engagement service could send a text message to the user's computing device commenting on an aspect of the video program. To accomplish this, the software application running on the video display device could be configured with a campaign that has a trigger condition that is satisfied when the video program being watched by the user progresses to a certain point. When the trigger condition is satisfied, it causes the campaign running on the video display device to send a notification message to the customer engagement service.

A campaign running on the customer engagement service can have a trigger condition that is receiving the notification from the software application on the video display device. When the notification from the software application on the video display device is received, satisfying the trigger condition, it will cause the customer engagement service to send the push notification to the user's computing device with a message commenting on the video program the user is watching.

As another example, a user could have a computing device that has been correlated to a video display device in a bar, because the user often frequents the bar to watch a particular sports program on that video display device. If the customer engagement service receives usage reports from the video display device and the user's computing device indicating that both have open sessions and both are using the same wireless network and/or the same wired or wireless access point, it would indicate to the customer engagement service that the user is at the bar and probably is watching the video being played on the video display device. Under these circumstances, the customer engagement service could send a message to the user's computing device commenting on the video program being shown on the video display device.

As another example, assume that a user has a user computing device that is correlated to a video display device at the user's residence. Assume also that the user, while still at work, views content about a particular issue at some point during their work day. Once the user gets home and switches on the correlated video display device, the software application on the user display device could recommend that the user watch a video program about the same topic as the issue they read about earlier in the day.

These are but a few examples of how correlations between a user computing device and a video display device could be used to help deliver timely and interesting messages to a user. Many other ways of using this information are also possible.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 13:
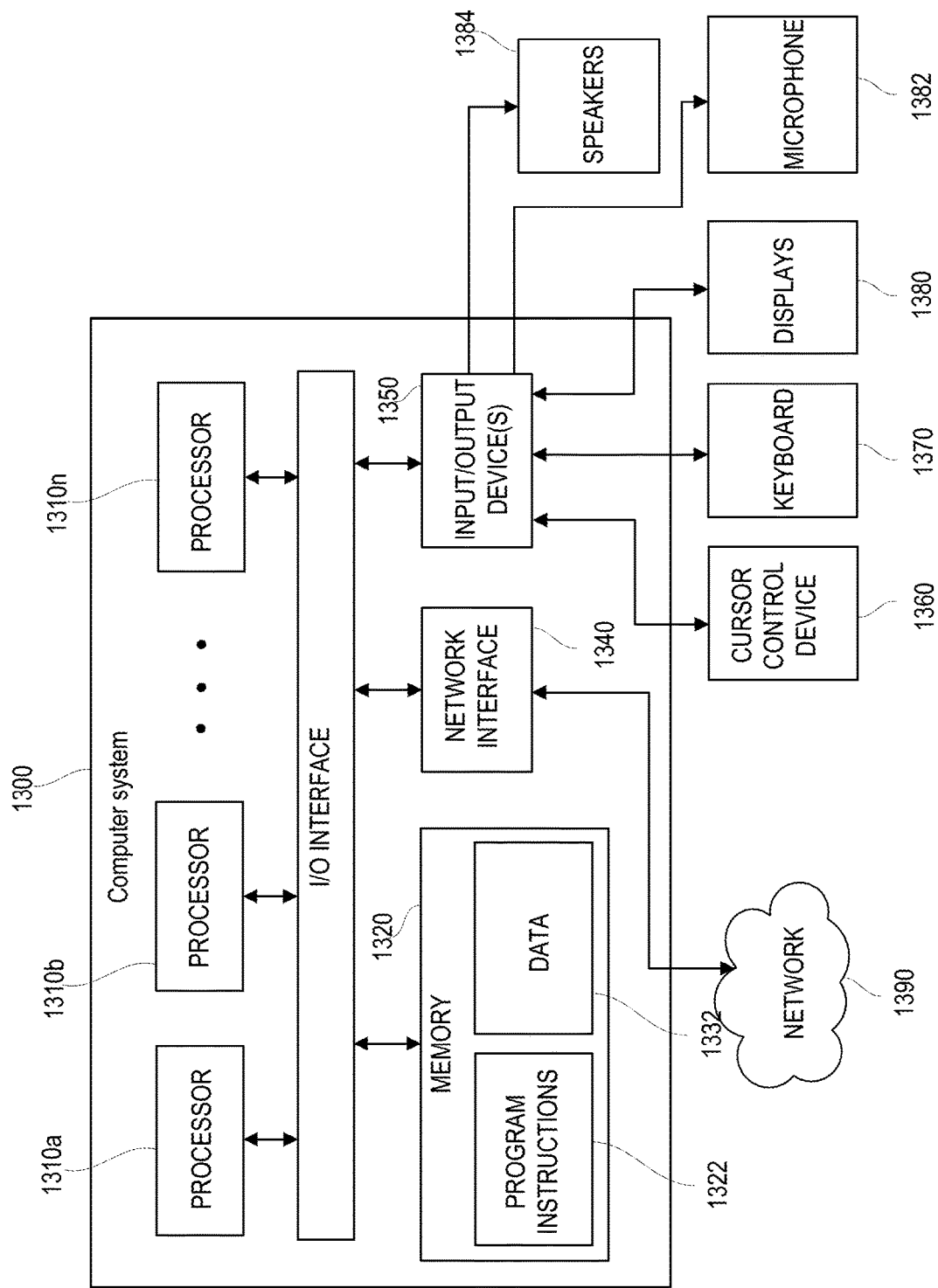
FIG. 13 is a diagram of a computer system and associated peripherals which could embody the invention, or which could be used to practice methods embodying the invention.

FIG. 13 depicts a computer system 1300 that can be utilized in various embodiments of the present invention to implement the invention according to one or more embodiments. The various embodiments as described herein may be executed on one or more computer systems, which may interact with various other devices. One such computer system is the computer system 1300 illustrated in FIG. 13. The computer system 1300 may be configured to implement the methods described above. The computer system 1300 may be used to implement any other system, device, element, functionality or method of the above-described embodiments. In the illustrated embodiments, the computer system 1300 may be configured to implement the disclosed methods as processor-executable executable program instructions 1322 (e.g., program instructions executable by processor(s) 1310) in various embodiments.

In the illustrated embodiment, computer system 1300 includes one or more processors 1310*a*-1310*n* coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, display(s) 1380, microphone 1382 and speakers 1384. In various embodiments, any of the components may be utilized by the system to receive user input described above. In various embodiments, a user interface may be generated and displayed on display 1380. In some cases, it is contemplated that embodiments may be implemented using a single instance of computer system 1300, while in other embodiments multiple such systems, or multiple nodes making up computer system 1300, may be configured to host different portions or instances of various embodiments. For example, in one embodiment some elements may be implemented via one or more nodes of computer system 1300 that are distinct from those nodes implementing other elements. In another example, multiple nodes may implement computer system 1300 in a distributed manner.

In different embodiments, the computer system 1300 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs). In multiprocessor systems, each of processors 1310 may commonly, but not necessarily, implement the same ISA.

System memory 1320 may be configured to store program instructions 1322 and/or data 1332 accessible by processor 1310. In various embodiments, system memory 1320 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1320. In other embodiments, program instructions and/or data may be received, sent or stored upon different types of computer-accessible media or on similar media separate from system memory 1320 or computer system 1300.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 13020, may be incorporated directly into processor 1310.

Network interface 1340 may be configured to allow data to be exchanged between computer system 1300 and other devices attached to a network (e.g., network 1390), such as one or more external systems or between nodes of computer system 1300. In various embodiments, network 1390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

In some embodiments, the illustrated computer system may implement any of the operations and methods described above, such as the methods illustrated by the flowcharts of FIGS. 4-9, 11 and 12. In other embodiments, different elements and data may be included.

Those skilled in the art will appreciate that the computer system 1300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1300 may also be connected to other devices that are not illustrated, or instead ay operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for correlating a software application on a user's computing device to a video display device, comprising:
    receiving, from a software application on a user computing device, a first computing device usage message that includes identifying information for a wireless network or an access point device that the user computing device is using to access a data network and an indication of a first time period that the software application on the user computing device was active while the user computing device was connected to the data network using the wireless network or the access point device;
    receiving, from a software application on a video display device, a first video display device usage message that includes identifying information for a wireless network or an access point device that the video display device is using to access the data network and an indication of a second time period that the video display device was displaying video content while connected to the data network using the wireless network or the access point device; and
    creating a correlation between the software application on the user computing device and the video display device if the first computing device usage message and the first video display device usage message indicate that the user computing device and the video display device were using the same wireless network or the same access point device to access the data network, and there is at least some degree of overlap between the first time period and the second time period.

2. The method of claim 1, further comprising generating a confidence factor that is indicative of a degree of likelihood that the user of the user computing device watches video displayed on the video display device.

3. The method of claim 2, wherein the confidence factor is greater the greater the degree of overlap between the first time period and the second time period.

4. The method of claim 1, further comprising:
    receiving, from the software application on the user computing device, a plurality of additional computing device usage messages in addition to the first computing device usage message, wherein each of the plurality of additional computing device usage messages includes identifying information for a wireless network or an access point device that the user computing device is using to access a data network and an indication of a time period that the software application on the user's computing device was active while the user's computing device was connected to the data network using the wireless network or access point device;
    receiving, from the software application on the video display device, a plurality of additional video display device usage messages in addition to the first video display device usage message, wherein each of the plurality of additional video display device usage messages includes identifying information for a wireless network or an access point device that the video display device is using to access the data network and an indication of a time period that the video display device was displaying video content while connected to the data network using the wireless network or access point device; and
    wherein the step of creating a correlation between the software application on the user computing device and the video display device is also based on the plurality of additional computing device usage messages and the plurality of additional video display device usage messages.

5. The method of claim 4, further comprising generating a confidence factor that is indicative of a degree of likelihood that the user of the user computing device watches video displayed on the video display device, where the confidence factor also is based on the plurality of additional computing device usage messages and the plurality of additional video display device usage messages.

6. The method of claim 5, wherein the confidence factor also is based on a number of times that the software application on the user computing device was active at the same time that the video display device was displaying video while the user computing device and the video display device were both connected to the data network via the same wireless network or access point device.

7. The method of claim 6, wherein the confidence factor also is based on a degree of overlap between time periods that the software application on the user computing was active and the video display device was displaying video while the user computing device and the video display device were both connected to the data network via the same wireless network or access point device.

8. The method of claim 5, wherein the confidence factor is based on a degree of overlap between time periods that the software application on the user computing was active and the video display device was displaying video while the user computing device and the video display device were both connected to the data network via the same wireless network or access point device.

9. The method of claim 1, further comprising:
  determining when the user computing device and the video display device are connected to the data network via the same wireless network or access point device based on information in the first computing device usage message and the first video display device usage message;
  causing a message to be displayed to the user on a display screen of the user computing device, the message asking the user to confirm that the user is watching a video program that is currently being displayed by the video display device, wherein the message is displayed to the user at a time when the user computing device and the video display device are connected to the data network via the same wireless network or access point device;
  receiving a confirmation message from the software application on the user computing device that indicates that the user has confirmed that the user is watching the video program currently being displayed on the video display device; and
  confirming, upon receipt of the confirmation message, that the correlation between the software application on the user computing device and the video display device is a valid correlation.

10. The method of claim 9, wherein causing a message to be displayed on a display screen of the user computing device comprises causing a push notification to be sent to the software application on the user computing device, where the push notification causes the message to be displayed on the display screen of the user computing device.

11. The method of claim 1, further comprising:
  determining when the user computing device and the video display device are both connected to the data network via the same wireless network or access point device based on information in the first computing device usage message and the first video display device usage message;
  causing a message to be displayed on the video display device, the message including a proposed identifier of the user and asking the user to confirm that the proposed user identifier is the correct identifier for the user, wherein the message is displayed on the video display device when the user computing device and the video display device are both connected to the data network via the same wireless network or access point device;
  receiving a confirmation message from the software application on the video display device that indicates that the user confirmed that the proposed user identifier included in the displayed message is the correct identifier for the user; and
  confirming, upon receipt of the confirmation message, that the correlation between the software application on the user's computing device and the video display device is a valid correlation.

12. A system for correlating a software application on a user's computing device to a video display device, comprising:
  a memory; and
  at least one processor coupled to the memory and configured to perform a method comprising:
    receiving, from a software application on a user computing device, a first computing device usage message that includes identifying information for a wireless network or an access point device that the user computing device is using to access a data network and an indication of a first time period that the software application on the user computing device was active while the user computing device was connected to the data network using the wireless network or the access point device;
    receiving, from a software application on a video display device, a first video display device usage message that includes identifying information for a wireless network or an access point device that the video display device is using to access the data network and an indication of a second time period that the video display device was displaying video content while connected to the data network using the wireless network or the access point device;
    creating a correlation between the software application on the user computing device and the video display device if the first computing device usage message and the first video display device usage message indicate that the user computing device and the video display device were using the same wireless network or the same access point device to access the data network, and there is at least some degree of overlap between the first time period and the second time period.

13. The system of claim 12, wherein the method performed by the at least one processor further comprises generating a confidence factor that is indicative of a degree of likelihood that the user of the user computing device watches video displayed on the video display device.

14. The system of claim 13, wherein the confidence factor is greater the greater the degree of overlap between the first time period and the second time period.

15. The system of claim 12, wherein the method performed by the at least one processor further comprises:
  receiving, from the software application on the user computing device, a plurality of additional computing device usage messages in addition to the first computing device usage message, wherein each of the plurality of additional computing device usage messages includes identifying information for a wireless network or an access point device that the user computing device is using to access a data network and an indication of a time period that the software application on the user's computing device was active while the user's computing device was connected to the data network using the wireless network or access point device;
  receiving, from the software application on the video display device, a plurality of additional video display device usage messages in addition to the first video display device usage message, wherein each of the plurality of additional video display device usage messages includes identifying information for a wireless network or an access point device that the video display device is using to access the data network and an indication of a time period that the video display device was displaying video content while connected to the data network using the wireless network or access point device; and
  wherein the step of creating a correlation between the software application on user computing device and the video display device is also based on the plurality of additional computing device usage messages and the plurality of additional video display device usage messages.

16. The system of claim 15, wherein the method performed by the at least one processor further comprises generating a confidence factor that is indicative of a degree of likelihood that the user of the user computing device watches video displayed on the video display device, where the confidence factor also is based on the plurality of additional computing device usage messages and the plurality of additional video display device usage messages.

17. The system of claim 16, wherein the confidence factor also is based on a number of times that the software application on the user computing device was active at the same time that the video display device was displaying video while the user computing device and the video display device were both connected to the data network via the same wireless network or access point device.

18. The system of claim 17, wherein the confidence factor also is based on a degree of overlap between time periods that the software application on the user computing was active and the video display device was displaying video while the user computing device and the video display device were both connected to the data network via the same wireless network or access point device.

19. The system of claim 16, wherein the confidence factor is based on a degree of overlap between time periods that the software application on the user computing was active and the video display device was displaying video while the user computing device and the video display device were both connected to the data network via the same wireless network or access point device.

20. The system of claim 12, wherein the method performed by the at least one processor further comprises:
   determining when the user computing device and the video display device are connected to the data network via the same wireless network or access point device based on information in the first computing device usage message and the first video display device usage message;
   causing a message to be displayed to the user on a display screen of the user computing device, the message asking the user to confirm that the user is watching a video program that is currently being displayed by the video display device, wherein the message is displayed to the user at a time when the user computing device and the video display device are connected to the data network via the same wireless network or access point device;
   receiving a confirmation message from the software application on the user computing device that indicates that the user has confirmed that the user is watching the video program currently being displayed on the video display device; and
   confirming, upon receipt of the confirmation message, that the correlation between the software application on the user computing device and the video display device is a valid correlation.

21. The system of claim 20, wherein causing a message to be displayed on a display screen of the user computing device comprises causing a push notification to be sent to the software application on the user computing device, where the push notification causes the message to be displayed on the display screen of the user computing device.

22. The system of claim 12, wherein the method performed by the at least one processor further comprises:
   determining when the user computing device and the video display device are both connected to the data network via the same wireless network or access point device based on information in the first computing device usage message and the first video display device usage message;
   causing a message to be displayed on the video display device, the message including a proposed identifier of the user and asking the user to confirm that the proposed user identifier is the correct identifier for the user, wherein the message is displayed on the video display device when the user computing device and the video display device are both connected to the data network via the same wireless network or access point device;
   receiving a confirmation message from the software application on the video display device that indicates that the user confirmed that the proposed user identifier included in the displayed message is the correct identifier for the user; and
   confirming, upon receipt of the confirmation message, that the correlation between the software application on the user's computing device and the video display device is a valid correlation.

\* \* \* \* \*